United States Patent
Hein et al.

(10) Patent No.: US 6,198,816 B1
(45) Date of Patent: Mar. 6, 2001

(54) CAPACITIVELY COUPLED RING DETECTOR WITH POWER PROVIDED ACROSS ISOLATION BARRIER

(75) Inventors: Jerrell P. Hein, Driftwood; Jeffrey W. Scott, Austin; Navdeep S. Sooch, Austin; David R. Welland, Austin, all of TX (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 09/034,428

(22) Filed: Mar. 4, 1998

Related U.S. Application Data

(63) Continuation-in-part of application No. 08/841,409, filed on Apr. 22, 1997, and a continuation-in-part of application No. 08/837,702, filed on Apr. 22, 1997, now Pat. No. 5,870,046, and a continuation-in-part of application No. 08/837,714, filed on Apr. 22, 1997.

(51) Int. Cl.[7] .......................... H04M 1/738; H04M 19/00
(52) U.S. Cl. ............................................. 379/373; 379/377
(58) Field of Search ...................... 379/398, 399, 379/405, 412, 413, 352, 373, 376, 379, 377

(56) References Cited

U.S. PATENT DOCUMENTS

| | | |
|---|---|---|
| 4,216,426 | 8/1980 | Flora . |
| 4,271,526 | 6/1981 | Flora . |
| 4,415,777 * | 11/1983 | Agnew ................................. 379/345 |
| 4,656,661 * | 4/1987 | Carbrey ................................ 379/399 |
| 5,068,659 | 11/1991 | Sakaguchi . |
| 5,323,451 * | 6/1994 | Yatsunami ........................... 379/373 |
| 5,337,338 | 8/1994 | Sutton et al. . |
| 5,384,808 | 1/1995 | Van Brunt et al. . |
| 5,442,694 * | 8/1995 | Chitrapu et al. ..................... 379/373 |
| 5,500,895 | 3/1996 | Yurgelites . |
| 5,506,900 | 4/1996 | Fritz . |
| 5,509,068 * | 4/1996 | Bayless et al. ...................... 379/376 |
| 5,533,053 | 7/1996 | Hershbarger . |
| 5,544,241 * | 8/1996 | Dibner et al. ....................... 379/373 |
| 5,577,104 * | 11/1996 | Knuth et al. ........................ 379/373 |
| 5,654,984 | 8/1997 | Hershbarger et al. . |
| 5,675,640 * | 10/1997 | Tappert et al. ..................... 379/373 |
| 5,751,803 * | 5/1998 | Shpater .............................. 379/379 |
| 5,790,656 | 8/1998 | Rahamim et al. . |
| 5,818,923 * | 10/1998 | Consiglio et al. .................. 379/373 |
| 5,991,335 * | 11/1999 | Price .................................. 375/219 |

OTHER PUBLICATIONS

Information Sheet—Siemens, *DAA2000 Optical DAA Kit—Preliminary*, pp. 1–21; Jun. 13, 1997.*
Siemens Press Release, *Siemens Pioneers Programmable Front End For Analog Modems Single Design For Worldwide Standards*, Aug. 6, 1997.*
Information Sheet—Siemens, *ICs for Communications, ALIS Reference Board, SIPB 4595 Version 1.0, Technical Description 06.97, Q67220–H1014*, Jun. 1997.*
Information Sheet—Siemens, *ICS for Communications, ALIS Evaluation Board, SIPB 45900 Version 1.1, Technical Description 06.97, Q67220–H1047*, Jun. 1997.*
Information Sheet—Siemens, *ALIS—Development Tools Evaluation Board*, pp. 1–3, Jul. 21, 1997.*

* cited by examiner

*Primary Examiner*—David R. Hudspeth
*Assistant Examiner*—Martin Lerner
(74) *Attorney, Agent, or Firm*—O'Keefe, Egan & Peterman

(57) ABSTRACT

A communication system is provided with a capacitive isolation barrier in which at least a portion of the ring detection circuits may be integrated into the line side circuitry. Moreover the ring detection circuits on the phone line side of the isolation barrier may be powered at least in part by power transmitted from the powered side of the isolation barrier to the phone line side of the isolation barrier through the barrier capacitors. A capacitive interface may directly connect the ringer circuitry on the phone line side of the barrier to the TIP/RING lines. The capacitive interface operates to linearly attenuate the TIP/RING signal voltage levels from the high phone line levels to levels within integrated circuit technology limitations.

46 Claims, 19 Drawing Sheets

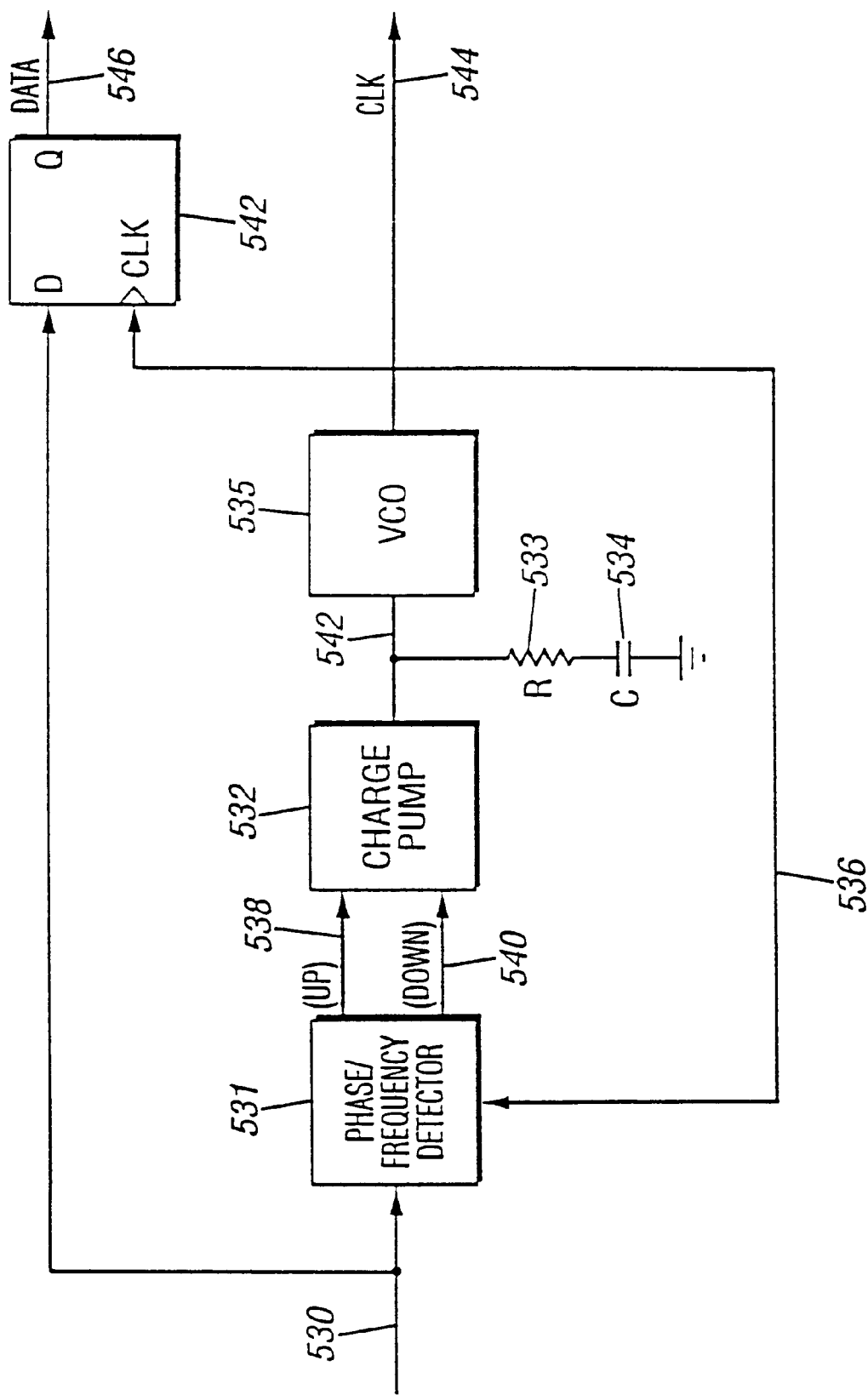

CAPACITIVELY COUPLED RING DETECTOR WITH POWER PROVIDED ACROSS ISOLATION BARRIER

This is a continuation-in-part of U.S. Ser. Nos. 08/841,409, 08/837,702 now U.S. Pat. No. 5,870,046 and U.S. Ser. No. 08/837,714 all filed on Apr. 22, 1997. Further, the following U.S. patent applications filed concurrently herewith Ser. No. 09/034,687, entitled "Digital Isolation System With Data Scrambling" by George Tyson Tuttle et al.; Ser. No. 09/034,456, entitled "Digital Isolation With ADC Offset Calibration" by Andrew W. Krone et al.; Ser. No. 09/034,455, entitled "Ring-Detect Interface Circuitry and Method for a Communication System" by Timothy J. Dupuis et al.; Ser. No. 09/035,779, entitled "Call Progress Monitor Circuitry and Method for a Communication System" by Timothy J. Dupuis et al.; Ser. No. 09/034,683, entitled "External Resistor and Method to Minimize Power Dissipation in DC Holding Circuitry for a Communication System" by Jeffrey W. Scott et al.; Ser. No. 09/034,682, entitled "Framed Delta Sigma Data With Unlikely Delta Sigma Data Patterns: by Andrew W. Krone et al.; and Ser. No. 09/035,175, entitled "Direct Digital Access Arrangement Circuitry and Method for Connecting to Phone Lines" Jeffrey W. Scott et al. are expressly incorporated herein by reference.

TECHNICAL FIELD OF THE INVENTION

This invention relates to the fields of phone line termination circuits and isolation systems for use in selectively isolating electrical circuits from one another. More particularly, this invention relates to isolation systems having capacitor-coupled isolation barriers for phone line termination circuits. This invention is useful in, for example, telephony, medical electronics and industrial process control applications.

BACKGROUND

Electrical isolation barriers can be identified in many industrial, medical and communication applications where it is necessary to electrically isolate one section of electronic circuitry from another electronic section. In this context isolation exists between two sections of electronic circuitry if a large magnitude voltage source, typically on the order of one thousand volts or more, connected between any two circuit nodes separated by the barrier causes less than a minimal amount of current flow, typically on the order of ten milliamperes or less, through the voltage source. An electrical isolation barrier must exist, for example, in communication circuitry which connects directly to the standard two-wire public switched telephone network and that is powered through a standard residential wall outlet. Specifically, in order to achieve regulatory compliance with Federal Communications Commission Part 68, which governs electrical connections to the telephone network in order to prevent network harm, an isolation barrier capable of withstanding 1000 volts nms at 60 Hz with no more than 10 milliamps current flow, must exist between circuitry directly connected to the two wire telephone network and circuitry directly connected to the residential wall outlet.

In many applications there exists an analog or continuous time varying signal on one side of the isolation barrier, and the information contained in that signal must be communicated across the isolation barrier. For example, common telephone network modulator/demodulator, or modem, circuitry powered by a residential wall outlet must typically transfer an analog signal with bandwidth of approximately 4 kilohertz across an isolation barrier for transmission over the two-wire, public switched telephone network. The isolation method and associated circuitry must provide this communication reliably and inexpensively. In this context, the transfer of information across the isolation barrier is considered reliable only if all of the following conditions apply: the isolating elements themselves do not significantly distort the signal information, the communication is substantially insensitive to or undisturbed by voltage signals and impedances that exist between the isolated circuitry sections and, finally, the communication is substantially insensitive to or undisturbed by noise sources in physical proximity to the isolating elements.

High voltage isolation barriers are commonly implemented by using magnetic fields, electric fields, or light. The corresponding signal communication elements are transformers, capacitors and opto-isolators. Transformers can provide high voltage isolation between primary and secondary windings, and also provide a high degree of rejection of lower voltage signals that exist across the barrier, since these signals appear as common mode in transformer isolated circuit applications. For these reasons, transformers have been commonly used to interface modem circuitry to the standard, two-wire telephone network. In modem circuitry, the signal transferred across the barrier is typically analog in nature, and signal communication across the barrier is supported in both directions by a single transformer. However, analog signal communication through a transformer is subject to low frequency bandwidth limitations, as well as distortion caused by core nonlinearities. Further disadvantages of transformers are their size, to weight and cost.

The distortion performance of transformer coupling can be improved while reducing the size and weight concerns by using smaller pulse transformers to transfer a digitally encoded version of the analog information signal across the isolation barrier, as disclosed in U.S. Pat. No. 5,369,666, "MODEM WITH DIGITAL ISOLATION" (incorporated herein by reference). However, two separate pulse transformers are disclosed for bidirectional communication with this technique, resulting in a cost disadvantage. Another disadvantage of transformer coupling is that additional isolation elements, such as relays and opto-isolators, are typically required to transfer control signal information, such as phone line hookswitch control and ring detect, across the isolation barrier, further increasing the cost and size of transformer-based isolation solutions.

Because of their lower cost, high voltage capacitors have also been commonly used for signal transfer in isolation system circuitry. Typically, the baseband or low frequency analog signal to be communicated across the isolation barrier is modulated to a higher frequency, where the capacitive isolation elements are more conductive. The receiving circuitry on the other side of the barrier demodulates the signal to recover the lower bandwidth signal of interest. For example, U.S. Pat. No. 5,500,895, "TELEPHONE ISOLATION DEVICE" (incorporated herein by reference) discloses a switching modulation scheme applied directly to the analog information signal for transmission across a capacitive isolation barrier. Similar switching circuitry on the receiving end of the barrier demodulates the signal to recover the analog information. The disadvantage of this technique is that the analog communication, although differential, is not robust. Mismatches in the differential components allow noise signals, which can capacitively couple into the isolation barrier, to easily corrupt both the amplitude and timing (or phase) of the analog modulated signal, resulting in unreliable communication across the barrier. Even with perfectly matched components, noise signals can couple preferentially into one side of the differential communication channel. This scheme also requires separate isolation components for control signals, such as hookswitch control and ring detect, which increase the cost and complexity of the solution.

The amplitude corruption concern can be eliminated by other modulation schemes, such as U.S. Pat. No. 4,292,595, "CAPACITANCE COUPLED ISOLATION AMPLIFIER AND METHOD," which discloses a pulse width modulation scheme; U.S. Pat. No. 4,835,486 "ISOLATION AMPLIFIER WITH PRECISE TIMING OF SIGNALS COUPLED ACROSS ISOLATION BARRIER," which discloses a voltage-to-frequency modulation scheme; and U.S. Pat. No. 4,843,339 "ISOLATION AMPLIFIER INCLUDING PRECISION VOLTAGE-TO-DUTY CYCLE CONVERTER AND LOW RIPPLE, HIGH BANDWIDTH CHARGE BALANCE DEMODULATOR," which discloses a voltage-to-duty cycle modulation scheme. (All of the above-referenced patents are incorporated herein by reference.) In these modulation schemes, the amplitude of the modulated signal carries no information and corruption of its value by noise does not interfere with accurate reception. Instead, the signal information to be communicated across the isolation barrier is encoded into voltage transitions that occur at precise moments in time. Because of this required timing precision, these modulation schemes remain analog in nature. Furthermore, since capacitively coupled noise can cause timing (or phase) errors of voltage transitions in addition to amplitude errors, these modulation schemes remain sensitive to noise interference at the isolation barrier.

Another method for communicating an analog information signal across an isolation barrier is described in the Silicon Systems, Inc. data sheet for product number SSI73D2950. (See related U.S. Pat. No. 5,500,894 for "TELEPHONE LINE INTERFACE WITH AC AND DC TRANSCONDUCTANCE LOOPS" and U.S. Pat. No. 5,602,912 for "TELEPHONE HYBRID CIRCUIT", both of which are incorporated herein by reference.) In this modem chipset, an analog signal with information to be communicated across an isolation barrier is converted to a digital format, with the amplitude of the digital signal restricted to standard digital logic levels. The digital signal is transmitted across the barrier by means of two, separate high voltage isolation capacitors. One capacitor is used to transfer the digital signal logic levels, while a separate capacitor is used to transmit a clock or timing synchronization signal across the barrier. The clock signal is used on the receiving side of the barrier as a timebase for analog signal recovery, and therefore requires a timing precision similar to that required by the analog modulation schemes. Consequently one disadvantage of this approach is that noise capacitively coupled at the isolation barrier can cause clock signal timing errors known as jitter, which corrupts the recovered analog signal and results in unreliable communication across the isolation barrier. Reliable signal communication is further compromised by the sensitivity of the single ended signal transfer to voltages that exist between the isolated circuit sections. Further disadvantages of the method described in this data sheet are the extra costs and board space associated with other required isolating elements, including a separate high voltage isolation capacitor for the clock signal, another separate isolation capacitor for bidirectional communication, and opto-isolators and relays for communicating control information across the isolation barrier.

Opto-isolators are also commonly used for transferring information across a high voltage isolation barrier. Signal information is typically quantized to two levels, corresponding to an "on" or "off" state for the light emitting diode (LED) inside the opto-isolator. U.S. Pat. No. 5,287,107 "OPTICAL ISOLATION AMPLIFIER WITH SIGMA-DELTA MODULATION" (incorporated herein by reference) discloses a delta-sigma modulation scheme for two-level quantization of a baseband or low frequency signal, and subsequent communication across an isolation barrier through opto-isolators. Decoder and analog filtering circuits recover the baseband signal on the receiving side of the isolation barrier. As described, the modulation scheme encodes the signal information into on/off transitions of the LED at precise moments in time, thereby becoming susceptible to the same jitter (transition timing) sensitivity as the capacitive isolation amplifier modulation schemes.

Another example of signal transmission across an optical isolation barrier is disclosed in U.S. Pat. No. 4,901,275 "ANALOG DATA ACQUISITION APPARATUS AND METHOD PROVIDED WITH ELECTRO-OPTICAL ISOLATION" (incorporated herein by reference). In this disclosure, an analog-to-digital converter, or ADC, is used to convert several, multiplexed analog channels into digital format for transmission to a digital system. Opto-isolators are used to isolate the ADC from electrical noise generated in the digital system. Serial data transmission across the isolation barrier is synchronized by a clock signal that is passed through a separate opto-isolator. The ADC timebase or clock, however, is either generated on the analog side of the barrier or triggered by a software event on the digital side of the barrier. In either case, no mechanism is provided for jitter insensitive communication of the ADC clock, which is required for reliable signal reconstruction, across the isolation barrier. Some further disadvantages of optical isolation are that opto-isolators are typically more expensive than high voltage isolation capacitors, and they are unidirectional in nature, thereby requiring a plurality of opto-isolators to implement bidirectional communication.

Thus, there exists an unmet need for a reliable, accurate and inexpensive apparatus for effecting bidirectional communication of both analog signal information and control information across a high voltage isolation barrier, while avoiding the shortcomings of the prior art.

As mentioned above, one common application for electrical isolation barriers is for use in electrical connections to the standard two-wire public switched telephone network. FIG. 16 illustrates a typical prior art phone line termination circuit. FIG. 16 shows the standard two-wire public network lines, the TIP line 1602 and the RING line 1604. The TIP line 1602 and the RING line 1604 are conventionally connected to a diode bridge 1606. The diode bridge presents the proper polarity line signal to the hookswitch circuit 1608 independent of the TIP and RING polarity. The hookswitch circuit 1608 operates to "seize" or "collapse" the TIP and RING phone lines to allow the maximum loop current ($I_{loop}$) that is available from the phone line to flow. The hookswitch circuit 1608 is coupled to electronic interface circuitry 1610. The electronic interface circuitry 1610 may contain a variety of devices and may be powered by the phone line. The electronic interface circuitry 1610 may also include an isolation barrier across which audio information may be transferred to the host powered circuitry 1616. A caller ID interface 1612 and a ringer interface 1614 may also be coupled between the TIP and RING lines and the host powered circuitry 1616. Both the caller ID interface 1612 and the ringer interface 1614 may also contain isolation barriers for coupling with the host powered circuitry 1616. The ringer interface 1614 operates to detect ring bursts on the phone line. Typical United States ring bursts are two second bursts of a 40 to 140 Vrms 15–68 Hz signal. The caller ID interface 1612 operates to extract the caller ID data which is embedded in the ring signal between the first and second ring burst. Generally the caller ID data is 1200/2200 Hz frequency shift keyed data. The end of ringing typically is indicated by the last ring burst being followed by a timeout period of approximately 5 seconds of no further ring bursts.

The circuits such as shown in FIG. 16 typically suffer from a number of problems. For example, typically the hookswitch circuits, caller ID interface, and ringer interface are all separate circuits. The hookswitch circuits and the caller ID interface are generally separated since the caller ID data is detected during on-hook conditions (ringing) when the hookswitch is off. Thus, separate circuitry in the caller ID interface is required to bypass the hookswitch and additional switch circuits in the Caller ID interface are opened during off-hook operation. The various switch circuits are typically implemented with external discrete high-voltage bipolar transistors including bipolar transistors dedicated for the hookswitch operation and bipolar transistors dedicated for the caller ID operation (see for example the Krypton Isolation, Inc. $K^2$930G DAA Data Sheet). Further, the ringer interface is often a non-linear network which would be unsuitable for detecting caller ID data and thus implemented through yet more separate circuitry. The use of these external components and separate circuits increases both costs and board space usage.

Another disadvantage of traditional interface techniques is that the ringer interface 1614 is generally formed from a combination of high voltage external components and opto-isolators. Further, the ringer interface may include integrated logic on the host side of the isolation barriers for performing burst detection, signal conditioning and timing functions. However, the use of high voltage external components and opto-isolators is undesirable due to costs. Moreover, all of the integrated ring detection circuits generally exist on the host side of the isolation barrier since generally only one-way communication exists with the opto-isolators.

Still another, disadvantage of traditional phone line interface techniques relates to the manner in which power supply voltages are obtained from the phone line signal. The phone line signal is a two wire system which provides both signal data and power by superimposing the signal data on a power supply voltage. A regulated voltage may be obtained from the power supply voltage and utilized for powering circuits such as analog to digital converters and digital to analog converters in the electronic interface device 1610. However, in order to maximize the regulated voltage, prior art techniques have attempted to minimize voltage drops across the diode bridge 1606 and the hookswitch 1608. To minimize these voltage drops, relays have been required for the hookswitch and special low voltage diodes have been utilized in the diode bridge (see for example the Siemans PSB4595 and PSB4596 Product Overview). Typically the relays may result in a voltage drop of almost zero and the low voltage diodes may be non-silicon diodes with voltage drops of 0.3–0.4 V. However, these components are undesirable due to increased costs.

Because of the disadvantages mentioned above and others, it is desirable to design an accurate yet a more efficient and cost effective phone line hookswitch interface, caller ID interface, and ringer interface. Moreover, it would be desirable to implement these interfaces in a system which includes an apparatus for effecting bidirectional communication across a high voltage isolation barrier.

SUMMARY OF THE INVENTION

A communication system is provided with a capacitive isolation barrier in which at least a portion of the ring detection circuits may be integrated into the line side circuitry. Moreover the ring detection circuits on the phone line side of the isolation barrier may be powered at least in part by power transmitted from the powered side of the isolation barrier to the phone line side of the isolation barrier through the barrier capacitors. A capacitive interface may directly connect the ringer circuitry on the phone line side of the barrier to the TIP/RING lines. The capacitive interface operates to linearly attenuate the TIP/RING signal voltage levels from the high phone line levels to levels within integrated circuit technology limitations.

In one embodiment, a communication system is provided. This system may include phone line side circuitry that may be coupled to phone lines and powered side circuitry that may be coupled to the phone line side circuitry through an isolation barrier. Ringer circuitry may be formed within an integrated portion of the phone line side circuitry, and a capacitive interface may couple the ringer circuitry to phone lines.

In another embodiment, a method of providing a communication system that may be coupled to a phone line is provided. This method may include coupling an isolation barrier between powered circuitry and phone line side circuitry, providing at least some integrated ringer circuitry within the phone line side circuitry, and capacitively coupling the integrated ringer circuitry to phone lines.

In yet another embodiment, a phone line connection circuit is provided. This may include an integrated circuit containing ringer circuitry, the ringer circuitry detecting a ringing condition on TIP and RING phone lines. The circuit may also include a capacitive interface coupling the ringer circuitry to the TIP and RING phone lines, the interface comprising at least a first and second capacitor.

In still another embodiment, a method of coupling an electrical circuit to a phone line is provided. This method may include providing at least a portion of a ringer detection circuit within an integrated circuit, and connecting the portion of the ringer detection circuit to the phone line through a capacitor interface without the use of an isolation barrier between the portion of the ringer detection circuit and the phone line.

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

FIG. 5 is a block diagram showing the components of exemplary clock recovery circuit that is used in the present invention.

DESCRIPTION OF PREFERRED EMBODIMENTS

Figure 1:
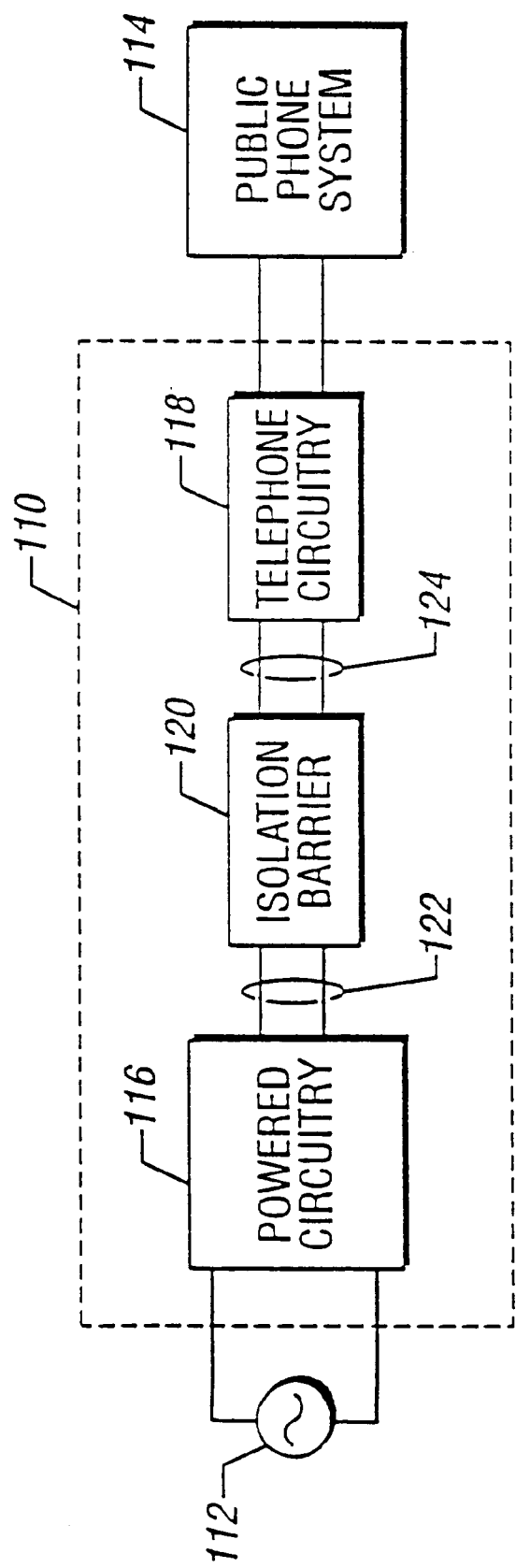
FIG. 1 is a block diagram of a telephone set illustrating a typical application of the present invention.

In order to provide a context for understanding this description, FIG. 1 illustrates a typical application for the present invention: a telephone that includes circuitry powered by a source external to the phone system. A basic telephone circuit 118 is powered by the "battery" voltage that is provided by the public telephone system and does not have a separate power connection. Many modem phones 110, however, include radio (cordless), speakerphone, or answering machine features that require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel.

The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
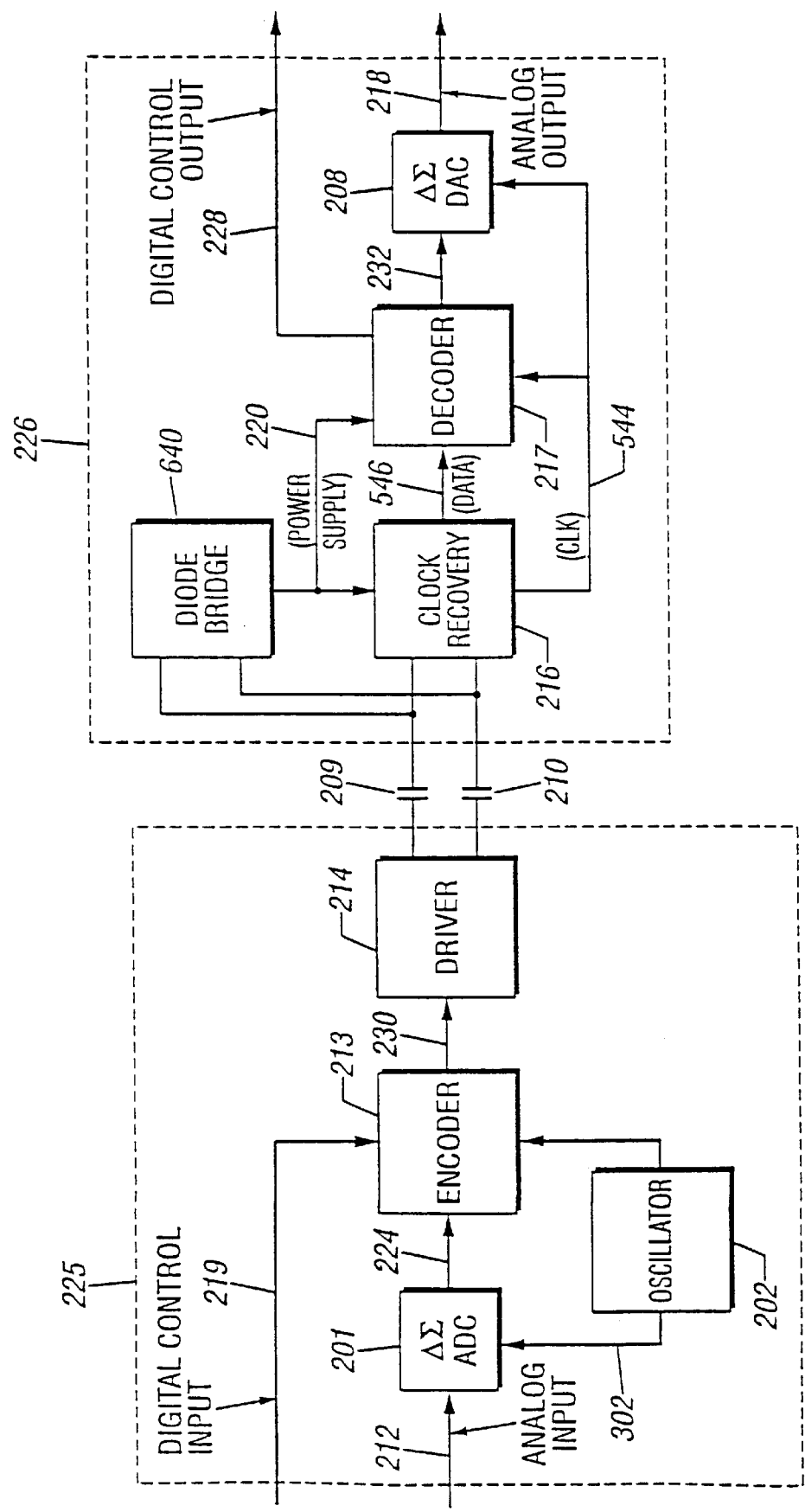
FIG. 2 is a block diagram showing a unidirectional isolation system according to the present invention.

FIG. 2 illustrates a basic block diagram of a preferred embodiment of the present invention. First the overall operation of the invention will be described, and then each component will be described in detail to the extent required to enable a person skilled in the art to make and use the invention. As a matter of terminology, the circuitry shown on the left or powered side of the isolation barrier (capacitors 209 and 210 in FIG. 2) will be referred to as the "powered" circuitry or the "transmit" circuitry or system, and the circuitry on the right side of the isolation barrier will be referred to as the "isolated" or "receive" circuitry or system. The "transmit" side can ordinarily be identified by the location of the dominant master oscillator 202 on that side of the barrier, and the slave oscillator (e.g. clock recovery circuit 216) is located on the receive side. Note, however, that in some embodiments of the present invention signals may be transmitted from the receive system to the transmit system, so these terms do not necessarily indicate the direction of data flow across the barrier. Furthermore, in some embodiments the master oscillator may be on the low-power (e.g. telephone system) side of the barrier, and a clock recovery PLL may be located on the high-power side of the barrier.

Referring to FIG. 2, a preferred unidirectional capacitive isolation system according to the present invention includes a delta-sigma analog to digital converter 201 operable on the analog input 212 and driven by a clock signal from oscillator 202. The digital output of the delta-sigma ADC 224 is synchronous with the operating frequency of oscillator 202 and time division multiplexed with digital control signals 219 by encoder circuit 213. The encoder circuit 213 also formats the resulting digital data stream 230 into a coding scheme or framing format that allows for robust clock recovery on the receiving side of the isolation barrier. The isolation barrier comprises two high voltage capacitors 209 and 210. In one embodiment of the present invention, driver circuit 214 drives the transmit side of capacitor 209 with a digital voltage signal. Clock recovery circuit 216 presents a very high impedance to the receive side of capacitor 209, allowing the digital voltage output of driver 214 to couple across the isolation barrier. In this embodiment, capacitor 210 provides a return current path across the barrier. In another embodiment, capacitors 209, 210 are differentially driven by complementary digital outputs of driver circuit 214. In that embodiment, clock recovery circuit 216 presents a very high impedance to the receive sides of capacitors 209 and 210, allowing the differential digital voltage outputs of driver 214 to couple across the isolation barrier. The input to driver circuit 214 is the output 230 of encoder 213.

The receive side of the isolation barrier includes clock recovery circuit 216, with inputs connected to isolation capacitors 209 and 210. The clock recovery circuit recovers a clock signal from the digital data driven across the isolation barrier. The recovered clock provides clocking signals for decoder 217 and delta-sigma digital-to-analog converter 208. Decoder circuit 217 separates the time division multiplexed data signal from control signals, providing a digital control output 228 and data output 232 that is routed to delta-sigma DAC 208. The delta-sigma DAC 208, with digital input supplied from decoder 217 and clock supplied from clock recovery circuit 216, provides the analog output of the receive side of the isolation system, which closely corresponds to the original analog input 212.

Active diode bridge circuit 640 may also be connected to isolation capacitors 209 and 210 to provide a DC voltage source 220 to clock recovery circuit 216 and decoder circuit 217 derived from energy contained in the signal transmitted across the isolation barrier.

In the descriptions of preferred embodiments that follow, all circuit references are made with respect to MOS (metal oxide-semiconductor) integrated circuit technology, although the invention may be implemented in other technologies as well, as will be understood by one skilled in the art. A preferred embodiment incorporates transmit system 225 consisting of delta-sigma ADC 201, oscillator 202, encoder 213 and driver 214 fabricated on one silicon substrate, and receive system 226 consisting of clock recovery circuit 216, decoder 217, delta-sigma DAC 208 and active diode bridge 640 fabricated on a second silicon substrate. The two separate silicon substrates are required to maintain the high voltage isolation provided by capacitors 209 and 210, since typical MOS technologies cannot provide high voltage isolation of 1000 volts or greater.

The delta-sigma analog-to-digital converter, shown as block 201 of FIG. 2, is well known in the art. See, for example, J. C. Candy, *A Use of Double Integration in Sigma Delta Modulation*, IEEE Trans. On Communication, March 1985, pp. 249–258, and B. E. Boser and B. A. Wooley, *The Design of Sigma-Delta Modulation Analog-to-Digital Converters*, IEEE Journal Solid State Circuits, December 1988, pp. 1298–1308, both of which are incorporated herein by reference. The specific design of ADC 201 will be a matter of design choice depending upon the needs of the particular application in which the isolation barrier will be used.

The use of a delta-sigma converter within the isolation system provides several desirable features. It will be appreciated that the delta-sigma converter uses a high oversampling rate to provide accurate A/D conversion over the input signal bandwidth without the use of precisely matched components or high-order, analog anti-aliasing filters. Moreover, such converters occupy a relatively small amount of space on an integrated circuit and are relatively easy to fabricate on a CMOS chip.

The digital pulse stream 224 output from delta-sigma converter 201 encodes the analog input signal 212 in a pulse density modulation format. In pulse density modulation, the amplitude information of the analog input signal is contained in the density of output pulses generated during a given interval of time.

Figure 3A:
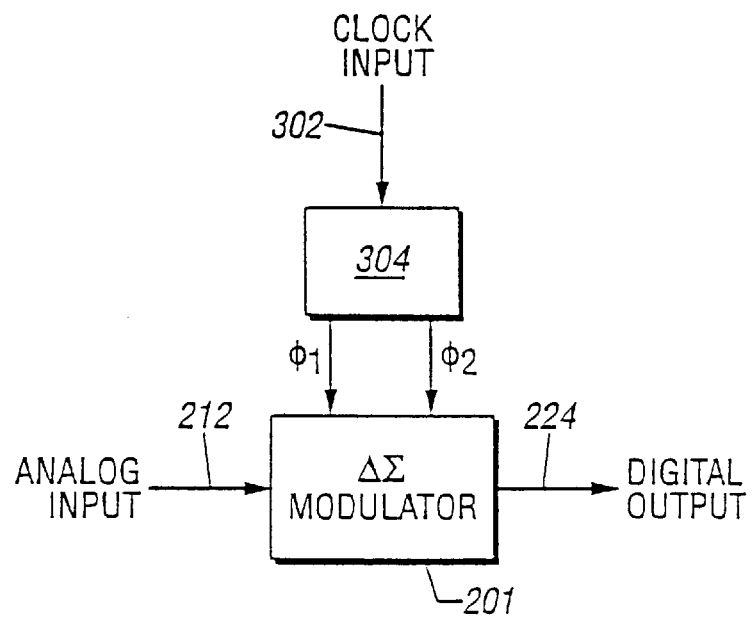
FIG. 3A is a block diagram detailing the circuitry used to provide a two-phase, non-overlapping clock signal to the delta-sigma modulators that are used in preferred embodiments of this invention.

Suitable designs for oscillator circuit 202 are well known in the art and may typically comprise a ring oscillator, relaxation oscillator, or an oscillator based on a piezoelectric crystal disposed external to the integrated MOS circuit. See, for example, A. B. Grebene, *Bipolar and MOS Analog Integrated Circuit Design*, John Wiley and Sons, 1984, which is incorporated herein by reference. FIG. 3A further illustrates the clock signals that may be provided to delta-sigma converter 201 in a preferred embodiment of this invention. Clock signal 302 from oscillator 202 is input to clock divider circuit 304 that divides the frequency of the input clock and provides an output in the form of two phase, non-overlapping clock signals $\emptyset_1$ and $\emptyset_2$ to the delta-sigma modulator circuit. The design and construction of clock divider circuit 304 is within the ordinary skill in the art and is not detailed here. Since encoder circuit 213 may perform time-division multiplexing of the digitized data signal 224 with digital control input data 219 using a time base derived from oscillator 202, clock divider 304 of FIG. 3A must typically divide the frequency of oscillator 202 by at least a factor of two.

Figure 3B:
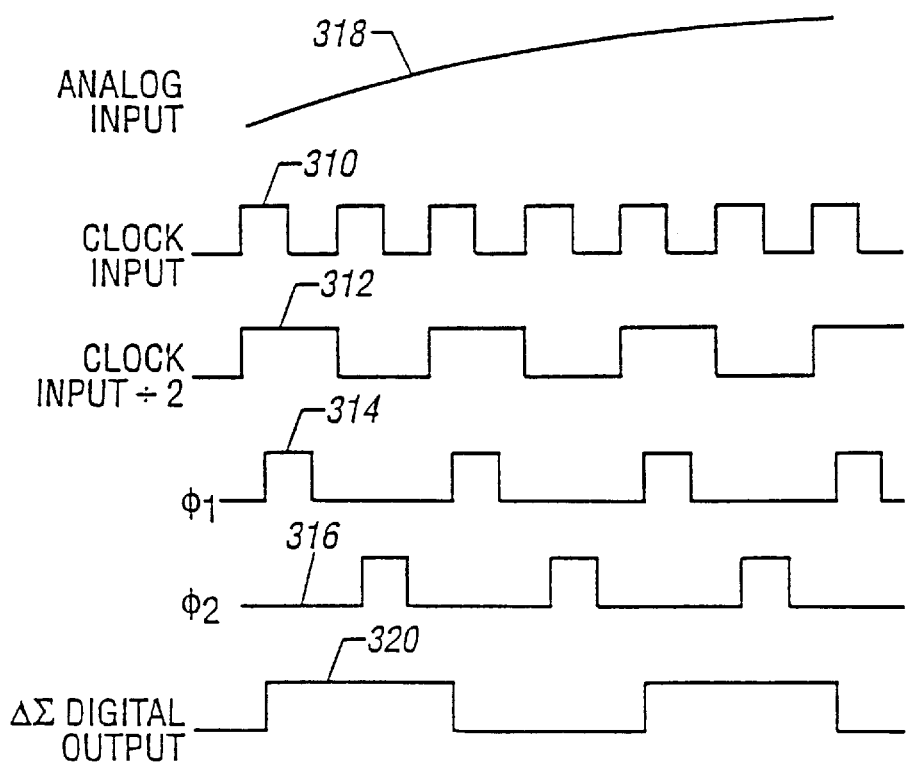
FIG. 3B is a timing diagram that illustrates timing relationships between various clock and data signals that occur in the circuitry of the present invention.

FIG. 3B illustrates exemplary signals associated with clock divider circuit 304 and delta-sigma modulator 201 in FIG. 3A. Trace 310 is the clock signal received from oscillator 202 on line 302. Trace 312 is the "clock divided by 2" signal that is generated by clock divider circuit 304. Traces 314 and 316 illustrate exemplary two phase, non-overlapping clock signals $\emptyset_1$ and $\emptyset_2$, respectively, that may be output from clock divider circuit 304 to delta-sigma modulator 201. Trace 318 represents the analog input to ADC 201, which generally changes very slowly in comparison to the frequency of clock signal 310. This bandwidth relationship is required because the delta-sigma modulator must operate at a sampling rate much higher than a typical Nyquist rate (for example, a 1 MHz sampling rate for a 4 kHz voiceband signal is typical) in order for the information in the analog signal to be accurately represented by the single-bit binary output. Finally, trace 320 represents the digital output of delta-sigma modulator 201, which may, for example, be synchronized to the rising edge of clock signal $\emptyset_1$. (The illustrated output bit pattern 320 is provided to show exemplary timing relationships and does not attempt to accurately reflect the illustrated analog input 318).

Figure 4A:
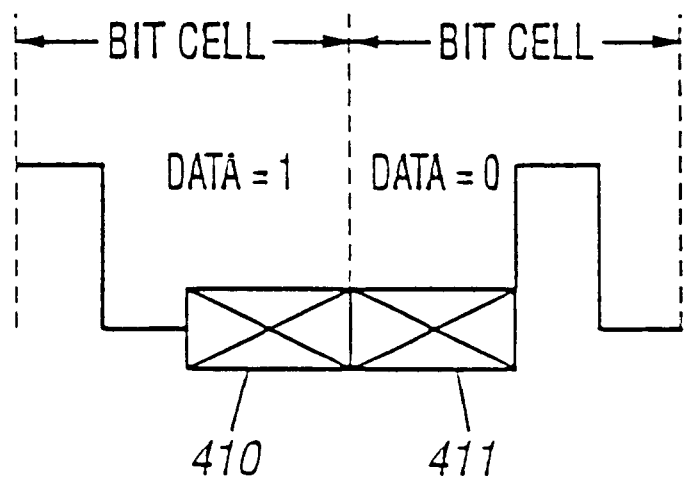
FIGS. 4A and 4B are diagrams that illustrate signal formats that may be produced by the encoders used in this invention.

Referring to FIG. 2, the encoder circuit 213 performs two primary functions in preferred embodiments of this invention. The first function of encoder 213 is time-division multiplexing of control signals 219 from other circuitry and data signals 224 from the delta-sigma modulator 201, an operation that is well known in the art and subject to many suitable implementations. The multiplexing function is synchronized by clock signals from oscillator 202. The second function of encoder 213 is formatting the data for transmission across isolation capacitors 209, 210. FIG. 4 details one coding scheme that may be used to transmit digital pulses across the capacitive isolation barrier. (Another suitable coding scheme is described below with reference to FIG. 14.) FIG. 4A shows the format for data sent from the transmit circuit to the receive circuit. When data=1 for a given bit cell, the output of the encoder is high for the first quarter of the bit cell period. When data=0 for a given bit cell, the output of the encoder is high for the third quarter of the bit cell period. This coding scheme guarantees one low-to-high transition followed by one high-to-low transition for every bit cell period, independent of the data pattern. The resulting data independent transition density allows for robust clock recovery in the receiving circuitry on the other side of isolation capacitors 209, 210. Alternatively, robust clock recovery can also be achieved by use of a preamble used for frequency locking followed by a data pattern which is not of constant average frequency.

In a bidirectional system, as is described below in connection with FIG. 7, the transmit system encoder 702 and driver 703 may cooperate to provide a high-impedance tri-state output to the isolation capacitor 705 during either the last half of the bit cell period 410 (if transmit data=1) or the first half of the bit cell period 411 (if transmit data=0) as shown in FIG. 4A. This permits transmission of information from the receive system to the transmit system during that portion of each bit cell when the transmit driver 703 is tri-stated.

Figure 4B:
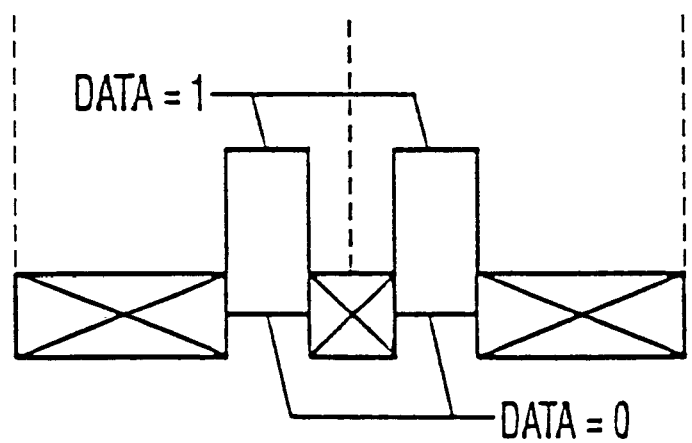

In a preferred embodiment, at the beginning of each bit cell period the receive system decoder section 708 detects whether the transmit circuit has sent a data=1 pulse across the isolation barrier. If a transmit data=1 pulse was sent, the receive driver remains tri-stated until the second half of the bit cell period, during which time a receive data=0 or 1 pulse can be sent back across the isolation barrier to the transmit system. If a transmit data=1 pulse is not detected by the receive circuit the receive driver sends receive data=0 or 1 during the first half of the bit cell period and tri-states for the second half of the bit cell period. This operation is shown in FIG. 4B.

In those embodiments in which the digital, bidirectional communication is differential, capacitors 705 and 706 are driven by complementary digital voltages in both directions, and the driver circuits associated with both capacitors are tri-stated during selected portions of the bit cell period in accordance with the coding scheme shown in FIG. 4.

Figure 13B:
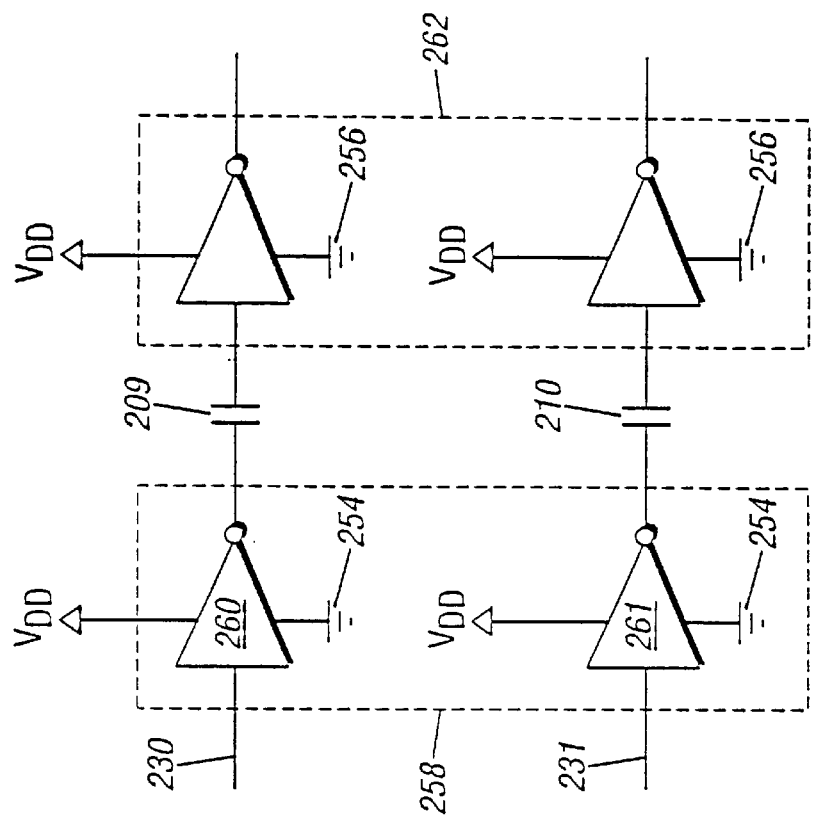
FIGS. 13A and 13B are schematic diagrams of driver circuits that may be utilized to implement the present invention.
Figure 13A:
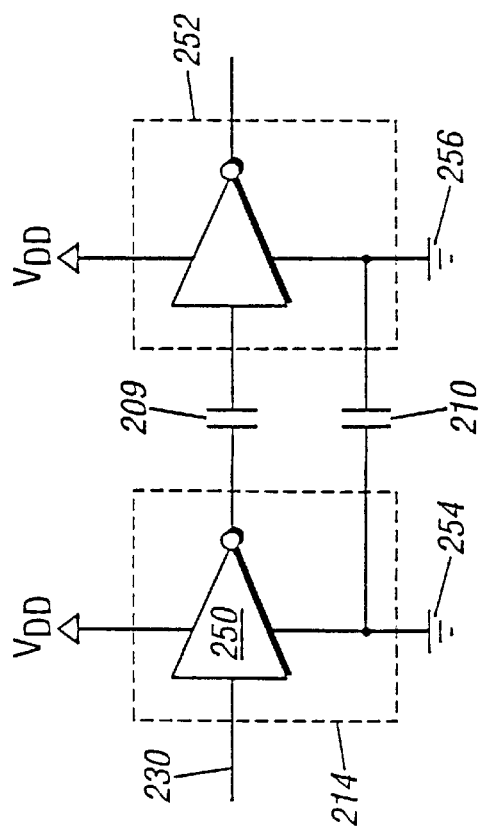

A preferred embodiment of the unidirectional driver circuit 214 of FIG. 2 is detailed in FIG. 13A for single ended (not differential) communication and FIG. 13B for differential communication across the capacitive isolation barrier. Referring to FIG. 13A, the transmit circuit driver 214 may comprise an inverter 250 driven by the encoder output signal 230. The output of inverter 250 drives the transmit circuit side of isolation capacitor 209 to transmit logic levels defined by the transmit $V_{DD}$ and ground voltage levels. The clock recovery input buffer presents a high impedance to the receive side of capacitor 209, thereby allowing the receive side of capacitor 209 to attain substantially the same logic levels as the transmit side of capacitor 209. In this manner the digital logic signal is effectively coupled across the capacitive isolation barrier.

Capacitor 210 is disposed between the transmit circuit ground node 254 and receive circuit ground node 256 in order to form a ground current return path across the isolation barrier. This path is required because the clock recovery buffer input impedance, although high, is not infinite. Therefore a small current must flow across the barrier and back in order to couple the digital logic signal across the barrier. Furthermore, capacitor 209 must deliver charge to the active diode circuit 640 (FIG. 2) in order that a supply voltage for several receive circuit sections can be provided. The current associated with this transfer of charge from the transmit circuit to the receive circuit must have a path to return to the transmit circuit.

The single-ended communication system described above is insensitive to voltage signals that may exist between the transmit circuit ground 254 and receive circuit ground 256 provided that the rate of change of such voltage signals is substantially less than the frequency of the digital signal transmitted across the barrier. The single-ended method is also insensitive to resistive and capacitive impedances that may exist between the transmit circuit ground 254 and receive circuit ground 256. The system can be desensitized to inductive impedances that may exist between the transmit circuit ground 254 and receive circuit ground 256 by adding resistive elements in series with capacitor 210, in series with the transmit ground connection 254, in series with the receive ground connection 256, or any combination of these.

FIG. 13B shows an example of a suitable differential driver 258 for unidirectional digital communication across a capacitive isolation barrier. The inverter 260 that drives capacitor 209 is driven by the digital signal output from the transmit encoder circuit 213, while inverter 261, which drives capacitor 210, is driven by the complement 231 of the digital signal output from transmit encoder circuit 213. Clock recovery input buffer 262 presents high impedances to the receive sides of capacitors 209 and 210, allowing the differential digital transmit voltages to couple across the isolation barrier. In this differential communication method, both capacitors 209 and 210 provide return current paths across the isolation barrier. The differential digital communication system described above is largely insensitive to voltage signals and impedances that may exist between the transmit circuit ground 254 and receive circuit ground 256, since these voltages and impedances appear as common mode influences in differential communication.

Bidirectional communication across the barrier can be supported by additional driver and receive buffer structures, similar to those shown in FIG. 13, without the need for any additional isolation elements, providing that inverters 250, 260, 261, which drive the high voltage isolation capacitors, can be tri-stated generally in accordance with the timing diagram shown in FIG. 4 or any other suitable coding and timing scheme. In some embodiments, additional capacitor driving inverters that can be tri-stated may be provided in a receive-side driver circuit 713 (FIG. 7) and input buffers may be provided in a transmit side decoder circuit 714.

In presently preferred embodiments, the actual isolation barrier comprises a pair of isolation capacitors 209 and 210, which are high voltage capacitors that may be chosen for a particular application to prevent DC and low frequency current flow across the barrier and protect the isolated circuitry from high voltage faults and transients, while permitting data at selected transmission frequencies to cross the barrier. The capacitors must be capable of withstanding anticipated voltages that may appear due to faults in the powered circuitry 225, in order to provide the protective function that is the purpose of the barrier. For example, in preferred embodiments ordinary 2000 volt capacitors with capacitance on the order of 100 pF may be utilized in the isolation barrier. In a barrier system in accordance with the present invention it is not necessary to use high precision capacitors, because the system is very tolerant of variations in capacitor performance due to environmental influences, such as variations in voltage and temperature.

A preferred embodiment for a clock recovery circuit 216 for use in this invention is detailed in FIG. 5 and described below. One section of the clock recovery circuit may be a phase locked loop ("PLL") circuit, consisting of phase/frequency detector 531, charge pump 532, resistor 533, capacitor 534, and voltage controlled oscillator ("VCO") 535. The other section of the clock recovery block is data latch 542 operating outside the phase locked loop to re-time the digital data received across the isolation barrier. Circuitry for performing these functions is well known to those skilled in the art. See, for example, F. Gardner, *Phaselock Techniques*, 2d ed., John Wiley & Sons, NY, 1979; and R. Best, *Phase-Locked Loops*, McGraw-Hill, 1984, which are incorporated herein by reference. The data input to the receive system from the isolation capacitors may be derived from a differential signal present at the barrier by passing the differential signal through MOS input buffers (not shown), which are well known in the art, and providing a single-ended binary output signal 530 to the clock recovery circuit.

The illustrated exemplary phase/frequency detector 531 receives a digital input 530 from the isolation barrier and an input 536 from the output of VCO 535 and performs a phase comparison between these two inputs. If the VCO phase lags the input data phase, a speed up signal 538 is supplied to charge pump 532. If the input data 530 phase lags the VCO output 536 phase, a slow down signal 540 is supplied to charge pump 532. In response to "speed up" inputs from phase/frequency detector 531, charge pump 532 delivers a positive current to the loop filter consisting of resistor 533 and capacitor 534 connected in series. In response to "slow down" inputs from the phase/frequency detector, charge pump 532 sinks a positive current from the loop filter. The output voltage of the loop filter at node 542 drives voltage controlled oscillator 535, which increases its operation frequency as the input voltage increases. The output of VCO 535 is fed back as input 536 to phase/frequency detector 531, and it is also used to re-time the input data 530 by serving as the clock input to flip-flop latch 542, thus providing a clock signal to the isolated circuitry and also providing data signal 546 that is synchronized to clock signal 544. A divider circuit may be included in the feedback path 536.

The phase/frequency detector and charge pump operate to increase loop filter voltage 542 and VCO frequency if VCO phase 536 lags input data phase 530. Conversely, the VCO frequency is decreased if the VCO phase leads input data phase. In this manner, the VCO output phase is adjusted until phase lock is achieved with input data. Consequently, the VCO frequency is driven to be substantially identical to the input data frequency.

If noise interference occurs at the isolation barrier, the input data transitions will occur at points in time that are noisy, or jittered, relative to the transition times of the transmit circuit driver. These jittered data edges will cause a noise component in the charge pump current that drives the loop filter. The loop filter and VCO, however, low-pass filter this noise component, substantially attenuating the effects of this input data jitter. Consequently, the VCO output signal, while frequency locked to the input data, contains substantially less phase noise than the noisy input data. The bandwidth of the phase noise filtering operation may be set independently of the bandwidth of the analog signal to be communicated across the isolation barrier. Since the filtered, phase locked loop output clock signal 544 is used to latch or re-time the noisy input data at flip flop 542, the effects of noise interference at the capacitive isolation barrier are substantially eliminated. Finally, the filtered, phase locked loop output clock signal 544 is used as the timebase or clock for the other receive circuits, including decoder 217 and delta-sigma DAC 208 shown in FIG. 2, resulting in an analog output 218 of the capacitive isolation system that is substantially free from any noise interference that may have been introduced at the capacitive isolation barrier.

Figure 6A:
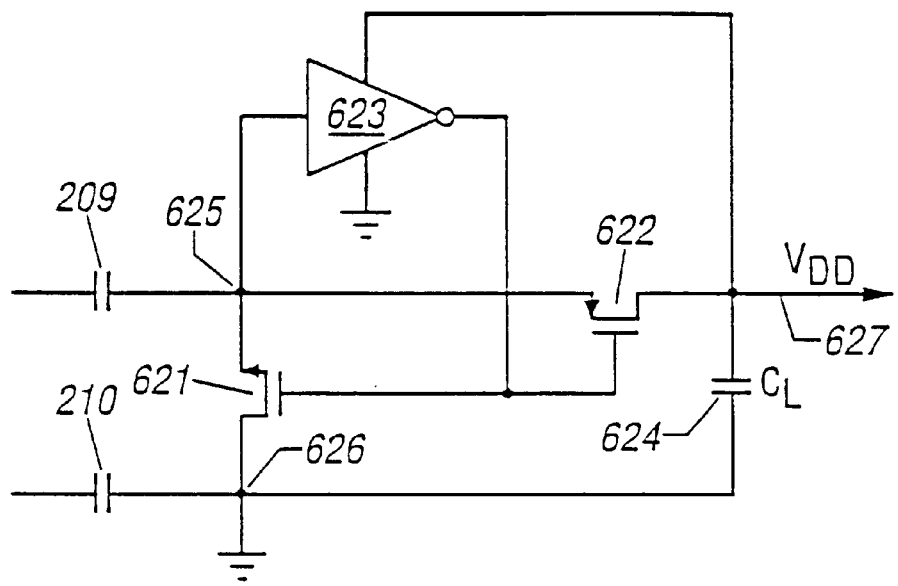
FIGS. 6A and 6B are schematic diagrams of active diode bridge circuits that may be used as power supplies in preferred embodiments of the present invention.
Figure 6B:
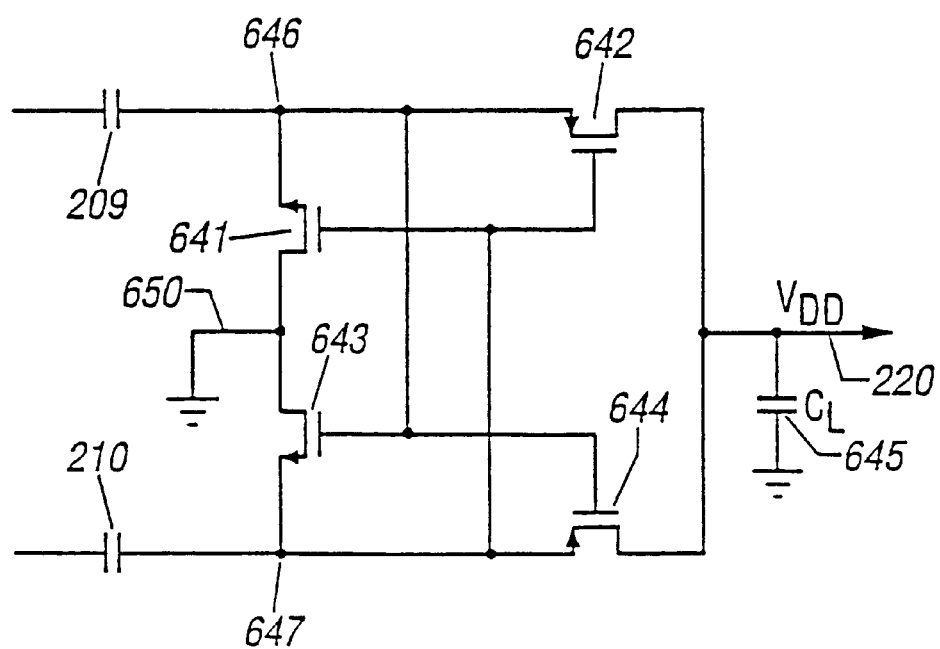

Preferred embodiments of active diode bridge circuit 640 of FIG. 2 are detailed in FIG. 6A for single-ended digital communication and FIG. 6B for differential digital communication across the isolation barrier. The active diode bridge generates a DC power supply voltage $V_{DD}$, which may be used to operate the clock recovery and receiver decoder circuits, in response to the digital data received across the capacitive isolation barrier. An active diode bridge circuit is distinguished from a standard or passive diode bridge in that the gating elements are active transistors rather than passive elements such as bipolar diodes.

Referring to the exemplary circuit illustrated in FIG. 6A, isolation capacitor 209 is connected to node 625 and isolation capacitor 210 is connected to node 626. The source of n-channel MOSFET 621 and the source of p-channel MOSFET 622 are connected to node 625. Also connected to node 625 is the input of standard CMOS inverter 623. The output of inverter 623 drives the gates of MOSFETS 621 and 622. The drain of n-channel MOSFET 621 is connected to node 626, the receive circuit ground node, while the drain of p-channel MOSFET 622 connects to node 627, which provides $V_{DD}$ voltage for the isolated circuitry. Also connected to $V_{DD}$ node 627 are load capacitor $C_L$ 624 and the power supply input of CMOS inverter 623. In a preferred embodiment, the power supply inputs of clock recovery circuit 216 and decoder circuit 217 shown in FIG. 2 are also connected to $V_{DD}$ node 627.

Referring to the exemplary embodiment illustrated in FIG. 6A, the operation of the active diode bridge circuit used in single-ended digital communication will now be described. A digital logic signal is coupled across capacitor 209 from the transmit section. When a digital "high" signal is received through capacitor 209, node 625 goes high. The logic "high" signal on node 625 forces the CMOS inverter 623 output node to go low, turning off device 621 and turning on device 622. Consequently, current flows through capacitor 209, device 622, and from $V_{DD}$ to receive circuit ground through capacitor $C_L$ and through clock recovery and decoder circuitry shown in FIG. 2. The circuit is completed by current flow returning across the isolation barrier through capacitor 210. The current demand by circuitry on $V_{DD}$ through capacitors 209 and 210 must be limited so that the voltage on node 625 relative to node 626 can still be recognized as a digital high logic level. When a digital "low" signal is received through capacitor 209, CMOS inverter 623 turns off device 622 and turns on device 621. Consequently, current flows across the isolation barrier through capacitor 210, through device 621, and returns across the isolation barrier through capacitor 209. Therefore, although no average current flows through capacitors 209 and 210, average current can be supplied from $V_{DD}$ to receive circuit ground to operate clock recovery circuit 216 and decoder circuit 217. Load capacitor 624 operates to minimize supply ripple on the DC supply voltage established on node $V_{DD}$.

Referring to the embodiment shown in FIG. 6B, isolation capacitor 209 connects to node 646 and isolation capacitor 210 connects to node 647. The source node of n-channel MOSFET 641 and the source node of p-channel MOSFET 642 connect to node 646. Also connected to node 646 are the gates of n-channel MOSFET 643 and p-channel MOSFET 644. The source node of n-channel MOSFET 643 and the source node of p-channel MOSFET 644 connect to node 647. Also connected to node 647 are the gates of n-channel MOSFET 641 and p-channel MOSFET 642. The drains of devices 641 and 643 are connected to the ground node of the receiving circuit. The drains of devices 642 and 644 are connected to the node 220, which provides $V_{DD}$ voltage for the isolated circuitry. Also connected to $V_{DD}$ node 220 are load capacitor $C_L$ 645 and the power supply inputs of clock recovery circuit 216 and decoder circuit 217 as shown in FIG. 2.

Referring to the exemplary embodiment illustrated in FIG. 6B, the operation of the active diode bridge used in differential digital communication will now be described. A differential digital signal is received through capacitors 209 and 210. When a digital 'high' signal is received through capacitor 209, a corresponding digital 'low' signal is received through capacitor 210, and node 646 goes high while node 647 goes low. This condition turns on devices 642 and 643 while turning off devices 641 and 644. Consequently, current flows through capacitor 209, device 642, from $V_{DD}$ to ground through capacitor $C_L$ and through clock recovery circuitry 216 and decoder circuitry 217 shown in FIG. 2. The circuit is completed from receive circuit ground 650, through device 643 and finally returning across the isolation barrier through capacitor 210. The current demand on $V_{DD}$ must be limited so that the voltage on node 646 relative to node 650 can be recognized as a high logic level signal by the clock recovery and decoder circuitry.

When a digital 'low' signal is received through capacitor 209, a digital 'high' signal is received through capacitor 210, and node 646 goes low while node 647 goes high. This condition turns on devices 641 and 644 while turning off devices 642 and 643. Consequently current flows through capacitor 210 and device 644 to $V_{DD}$ node 220, and from there to ground through capacitor 645 and through clock recovery and decoder circuitry shown in FIG. 2. The circuit is completed from ground 650, through device 641 and finally returning across the isolation barrier through capacitor 209. Therefore, in either logic state, and independently of the current flow direction through capacitors 209 and 210, current flows in the same direction from $V_{DD}$ to ground. Therefore, an average or DC supply voltage is established on node $V_{DD}$, and adequate current can be supplied to operate clock recovery circuit 216 and decoder circuit 217. Load capacitor 645 operates to minimize power supply ripple, providing a filtering operation on $V_{DD}$. An added benefit of the ability to power sections of the isolated circuitry from the digital signal transmitted across the capacitive isolation barrier from the powered circuitry is that it allows isolated power-up and power-down control of isolated circuitry sections on an as-needed basis.

Parasitic bipolar transistors may result from typical CMOS processes. If they are not controlled, these bipolar transistors can discharge the power supply 627 shown in FIG. 6A during the initial power up time. If the discharge current from the parasitic bipolar transistors is larger than the current delivered to the power supply 627 through transistor 622, then the circuit may not power up to the desired full voltage level. The beta of a lateral bipolar transistor in any CMOS process is a function of layout. With appropriate layout (i.e., large base region), the beta can be kept small enough to minimize undesired discharge currents. Further care needs to be taken in the design of any circuit that is connected to power supply 627. The circuits connected to power supply 627 cannot draw more current from the power supply than is available from the active diode bridge, even before the supply has ramped to the full value. Circuit design techniques to address these issues are common and well known in the art.

In the illustrative embodiment shown in FIG. 2, delta-sigma digital to analog converter (DAC) 208 receives input data from decoder 217 and synchronous clock input from clock recovery circuit 216. Analog output signal 218 is generated by DAC 208 in response to the digital data that is communicated across the capacitive isolation barrier. The output signal 218 is highly immune to amplitude and phase noise that may be introduced in the barrier circuitry because the signal that is communicated across the isolation capacitors is a synchronous digital signal, and because the received data is resynchronized to the recovered, jitter-filtered clock signal. The DAC is also timed by that clock signal. Delta-sigma DAC technology is well known in the art, and selecting a suitable DAC circuit will be a matter of routine design choice directed to the intended application of the barrier circuit. See, for example, P. Naus et al., *A CMOS Stereo 16-Bit D/A Converter for Digital Audio*, IEEE Journal of Solid State Circuits, June 1987, pp. 390–395, which is incorporated herein by reference.

Figure 7:
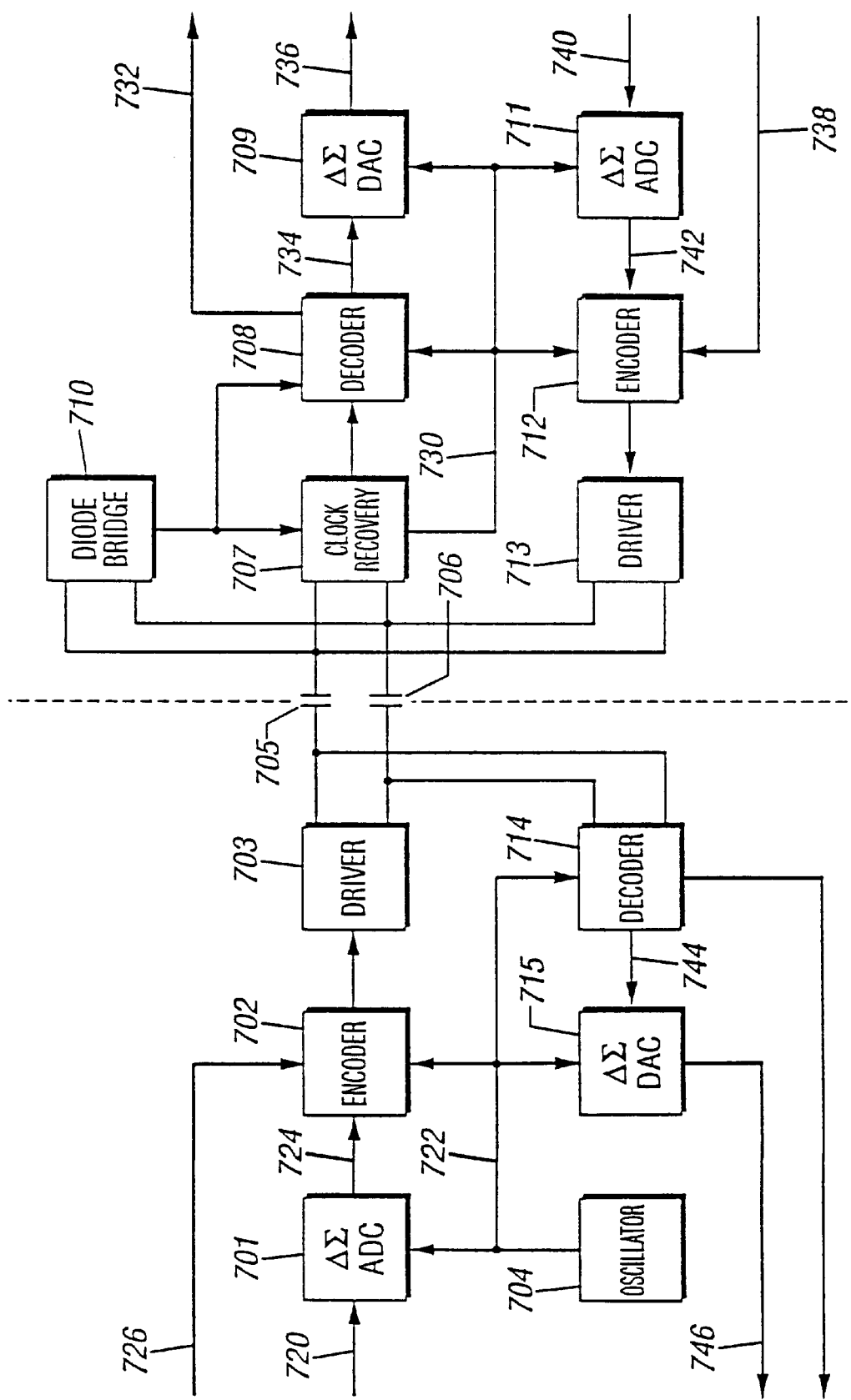
FIG. 7 is a block diagram illustrating a bidirectional isolation system according to the present invention.

FIG. 7 illustrates a preferred bidirectional embodiment of the present invention. It will be recognized that other uni-directional and bidirectional isolation barriers may be designed by persons skilled in the art using the principles described herein, and that such barriers will fall within the scope of this invention. In the illustrated and described embodiment, the capacitive isolation system comprises a "transmit" system to the left of center, a "receive" system to the right of center, and a capacitive isolation barrier in the center of the figure comprising two high voltage capacitors 705 and 706. Note that the terms "transmit" and "receive" are used to identify the powered and isolated sides of the barrier, respectively, and that in this embodiment data may be conveyed across the barrier in both directions. Many of the components in this bidirectional embodiment are identical or similar to those in the unidirectional embodiment described above with reference to FIG. 2.

The transmit system includes delta-sigma analog-to-digital converter 701 operable on the analog input 720 of the transmit circuit and synchronized to clock signal 722 from oscillator 704. The analog input 720 of the transmit system is an analog signal containing information to be transmitted across the isolation barrier, which may be for example an analog voice signal to be coupled to a telephone system. Digital output 724 of the delta-sigma ADC may be time-division multiplexed with digital control input 726 by the encoder circuit 702. Digital control input 726 is a digital signal containing additional information to be transmitted across isolation barrier 705, 706. Digital control input 726 may include control information for analog circuitry on the receiving side of the isolation barrier. Encoder circuit 702 also formats the resulting data stream into a coding scheme that allows for robust clock recovery on the receiving side of the isolation barrier, as is described above.

Encoder circuit 702 also receives a clock signal 722 from oscillator 704. Driver circuit 703 of the transmit system drives the encoded signal to isolation capacitors 705 and 706 in response to the output of encoder circuit 702.

The isolation barrier comprises two high voltage capacitors 705, 706. In one embodiment, capacitor 705 is driven bidirectionally by drivers 703, 713 while capacitor 706 provides a return path across the isolation barrier. In another embodiment of the present invention, capacitors 705 and 706 are differentially driven by digital driver circuits 703, 713.

A preferred embodiment of the receive system, shown to the right of isolation capacitors 705, 706 in FIG. 7 includes clock recovery circuit 707, whose inputs are connected to isolation capacitors 705, 706. The clock recovery circuit recovers a clock signal from the digital data driven across the isolation barrier and provides synchronized clock signal 730 to the various circuits in the receive system. The recovered clock operates as the time base for decoder 708 and delta-sigma digital-to-analog converter 709. Decoder section 708 separates the time division multiplexed data and control information, providing digital control output 732 to other circuitry, and providing synchronous data signal 734 as an input to delta-sigma DAC 709. The delta-sigma DAC 709, with digital input 734 supplied by decoder 708, and clock signal 730 supplied by clock recovery section 707, operates synchronously with the transmit system delta-sigma ADC 701 and provides analog output 736 on the receiving side of the isolation barrier. Active diode bridge 710 is connected to isolation capacitors 705 and 706 and supplies a DC power supply voltage to clock recovery circuit 707 and decoder circuit 708 by drawing current from the digital signal transmitted across the isolation barrier, as is described in detail above. Driver 713 must remain tri-stated until decoder 708 has detected a valid frame, indicating successful power-up of the receive circuit sections.

The embodiment shown in FIG. 7 also enables communication from the receive system to the transmit system, or from right to left across the isolation capacitors as illustrated. The receive system encoder circuit 712 and driver circuit 713 cooperate to communicate information back from the receive system to the decoder circuit 714 in the transmit system. Receive system encoder section 712 receives a clock input 730 from clock recovery section 707, and is thereby synchronized to the transmit system oscillator 704 and encoder 702. This synchronization allows transmission in each direction to occur in distinct time slots. In time slots where transmit driver 703 is operable to transmit information from the transmit system to the receive system, receive driver 713 is tri-stated or disabled. Alternatively, in time slots where receive driver 713 is operable to transmit information back from the receive system to the transmit system, transmit driver 703 is tri-stated or disabled. In this manner, bidirectional communication may be established across a single pair of high voltage isolation capacitors.

Digital control input 738 of the receive system is a digital signal containing information to be communicated across the isolation barrier, including control information for analog circuitry on the transmit system side of the barrier. The receive system also includes delta-sigma ADC 711 operable on analog input signal 740 so that the information contained in analog signal 740 on the receive system side of the isolation barrier can be conveyed across the barrier in digital form and then accurately reproduced on the transmit system side of the barrier. The receive system delta-sigma ADC 711 receives its clock input from clock recovery circuit 707, and is thereby synchronized with transmit system oscillator 704. Digital output signal 742 generated by receive system ADC 711 may be time-division multiplexed with receive system digital control input 738 in encoder section 712.

In the transmit system, decoder circuit 714 is connected to isolation capacitors 705, 706 to receive signals therefrom, identify signals representing information coming from the receive system. Decoder 714 then extracts the digital control information from the data stream received from the receive circuit, and passes data signal 744 generated by delta-sigma ADC 711 to transmit system delta-sigma DAC 715. Decoder 714 also latches and retimes the data received across the barrier to synchronize it with clock signal 722, which is generated by oscillator 704, thereby eliminating the effects of phase noise interference and other sources of jitter in the synchronous digital signal. Circuits that are suitable for performing these decoder functions are well known in the art.

Transmit system delta-sigma DAC 715 receives its clock input from oscillator 704 and is thereby synchronized to receive system ADC 711. Transmit system DAC 715 provides a reconstructed analog data output signal 746, thereby completing the communication of analog information back from the receive system to the transmit system.

In summary, FIG. 7 describes a bidirectional communication system for conveying analog and digital information across a capacitive isolation barrier. The barrier itself is inexpensive, since only two high voltage isolation capacitors are required for synchronous, bidirectional communication. The barrier is a reliable communication channel because the digital signals communicated across the barrier are insensitive to amplitude and phase noise interference that may be introduced at the isolation barrier.

Figure 8:
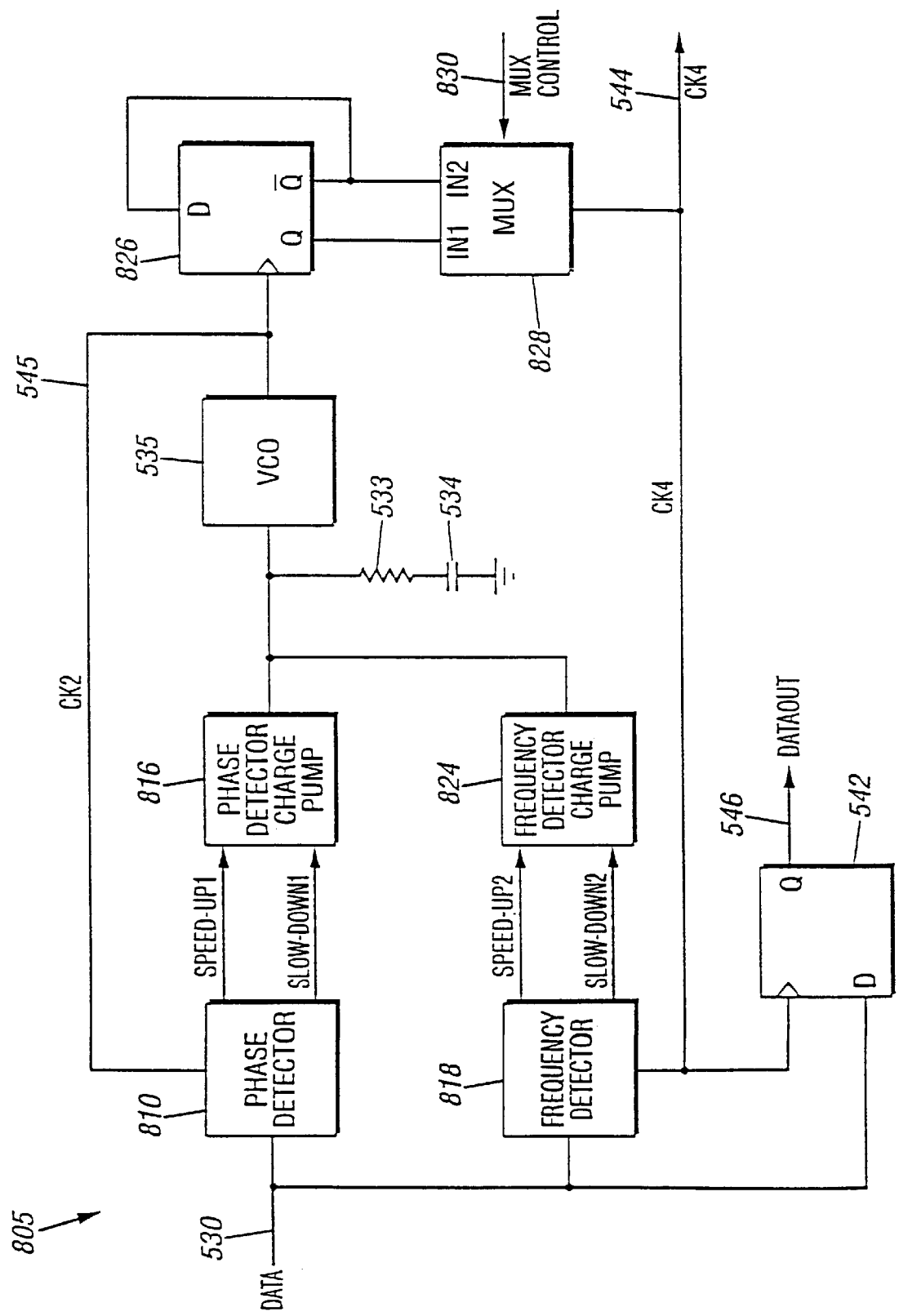
FIG. 8 is a block diagram of a clock recovery and data synchronization circuit according to a preferred embodiment of the present invention.

A more detailed description of a clock recovery circuit suitable for use in this invention with the coding scheme of FIG. 4 will now be provided, with reference to FIG. 8. Clock recovery PLL 805 has data input 530, data output 546 and recovered clock signal output 544. Phase detector 810 has inputs DATA 530 and feedback clock signal CK2 545. The outputs of phase detector 810 are SPEED-UP1 and SLOW-DOWN1 signals, both of which are connected to inputs of phase detector charge pump 816. Frequency detector 818 has inputs DATA 530 and output clock signal CK4 544. The outputs of frequency detector 818 are signals designated SPEED-UP2 and SLOW-DOWN2, which are connected to the inputs of frequency detector charge pump 824. The outputs of phase detector charge pump 816 and frequency detector charge pump 824 are connected together and are also connected to the input of voltage controlled oscillator ("VCO") 535 and one terminal of resistor 533. The other terminal of resistor 533 is connected to one terminal of capacitor 534. The other terminal of capacitor 534 is connected to ground. The output of VCO 535 is the CK2 signal 545. The clock input of flip-flop 826 is connected to CK2 545. The Q-bar output of flip-flop 826 is connected to the D input of flip-flop 826. The Q and Q-bar outputs of flip-flop 826 are connected to the inputs of multiplexer (mux) 828. The control input 830 of mux 828 is called MUX CONTROL and comes from the framing logic, which is described elsewhere in this specification. The output of mux 828 is the CK4 signal 544. The D input of flip-flop 542 is connected to data input 530. The clock input of flip-flop 542 is connected to the CK4 signal 544. The Q output of flip-flop 542 is the resynchronized DATAOUT signal 546, which is sent to the frame detect logic.

Frequency detector 818 is dominant over phase detector 810 when the frequency of the DATA and CK4 signals are different. Once the frequency of the DATA and CK4 signals are substantially similar, the SPEED-UP2 and SLOW-DOWN2 signals become inactive and phase detector 810 becomes dominant. Separate charge pumps for the phase detector and frequency detector allow for independent control of the gain of the phase detector and frequency detector circuits. Alternatively, if independent gains are not required, then the SPEED-UP1 and SPEED-UP2 signals could be logically ORed together to drive one charge pump. And likewise the SLOW-DOWN1 and SLOW-DOWN2 signals could be logically ORed together to drive the other input to the charge pump.

The output of VCO 535 is the CK2 signal, which is divided by two in frequency by flip-flop 826. Since CK2 is divided by two to generate the bit rate clock signal CK4, there can be two phases of CK4 with respect to the start of a bit period. The phase of CK4 that will yield correct operation of the frequency detector is the one where the rising edge of CK4 aligns with the start of a bit period. The frame-detect logic is needed to detect the start of a bit interval and is used to select the appropriate phase of CK4 using mux 828.

Figure 15:
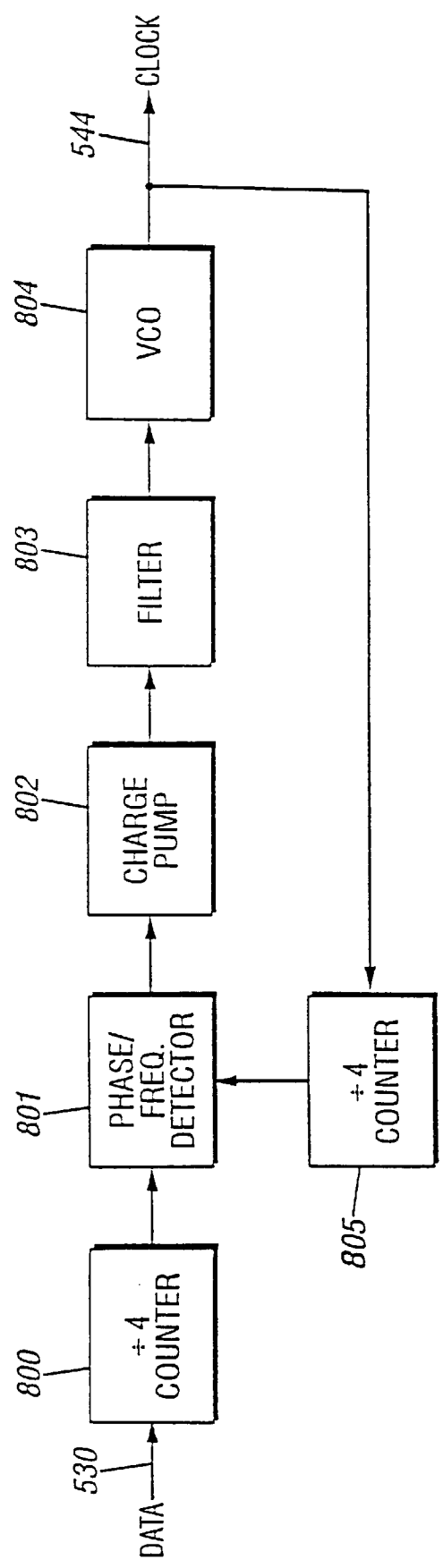
FIG. 15 is a block diagram of a clock recovery circuit that may be employed for use with the framing format of FIG. 14.

It will be appreciated that a clock recovery circuit according to this invention, such as that illustrated in FIG. 8 or FIG. 15, may be beneficially used to recover and stabilize a clock signal on the isolated side of the barrier where the clock signal is conveyed via isolation elements that are separate from the isolation elements that are used to transfer the data signal.

Figure 11:
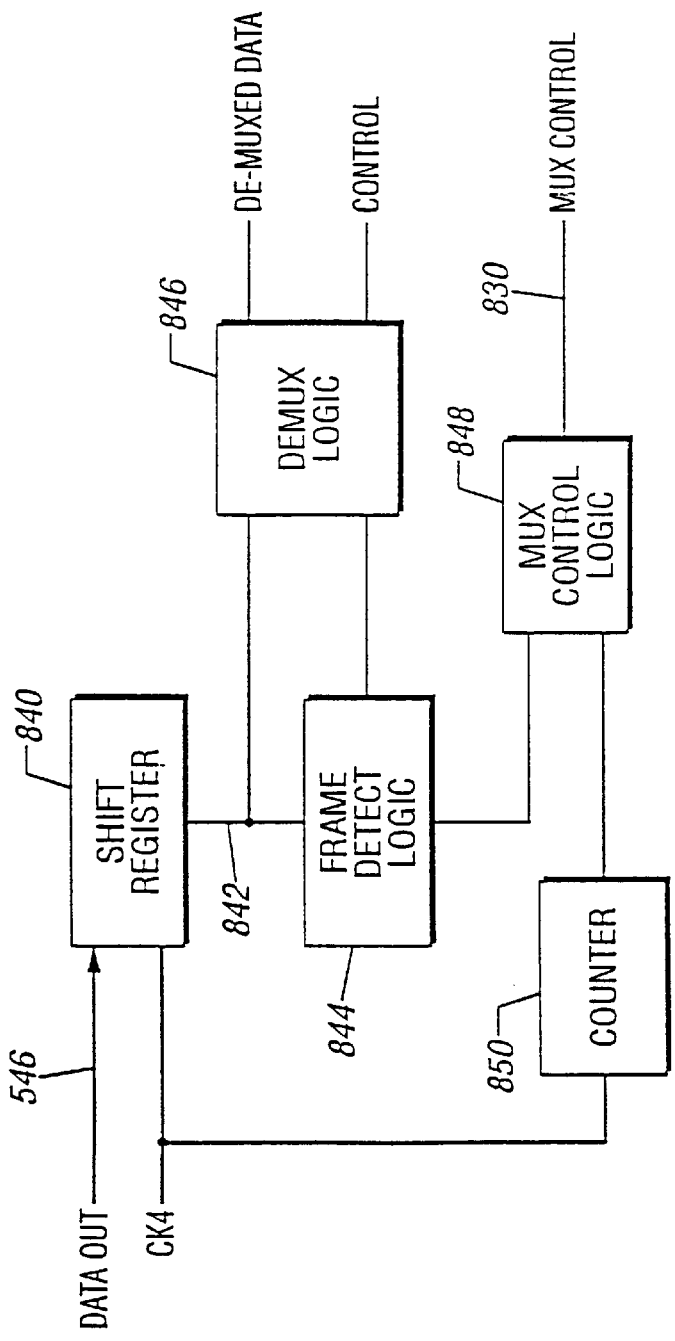
FIG. 11 is a block diagram of a decoder circuit that may be utilized in a preferred embodiment of the present invention.

A preferred embodiment of a decoder circuit 708 is shown in FIG. 11. Shift register 840 has an input connected to the DATAOUT signal 546 from clock recovery circuit 805 and is clocked by recovered clock signal CK4. Multi-bit output 842 of shift register 840 is connected to frame-detect logic 844 and to demux logic 846. Frame detect logic 844 has one output connected to mux control logic 848 and one output connected to demux logic 846. Demux logic 846 is clocked by CK4. Counter 850 is also clocked by CK4. The output of counter 850 is connected to mux control logic 848. The output of mux control logic 848 is the MUX-CONTROL signal 830 sent to the clock recovery PLL 805 to select the proper phase for the CK4 signal. The outputs of demux logic 846 are the DEMUXED DATA signal and the CONTROL signal.

Figure 12:
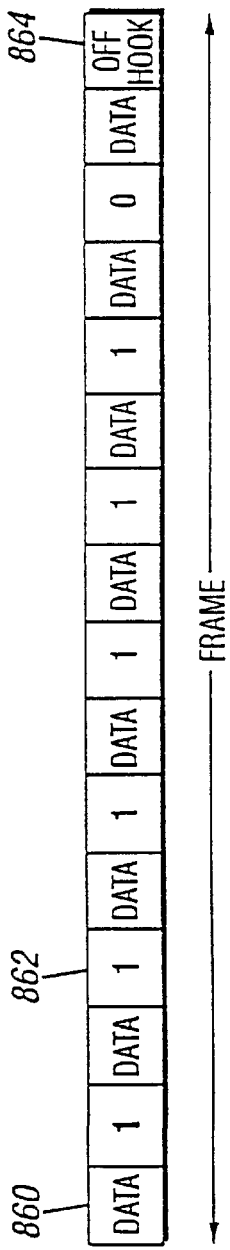
FIG. 12 is an illustration representing a framing format that may be beneficially used in preferred embodiments of the present invention.

Shift register 840 stores a predetermined number of bits of the serial DATAOUT signal 546. Frame-detect logic 844 operates on this data and detects when a frame signal is received. Many possible framing signal formats can be used. A format that may be used in a presently preferred embodiment is shown in FIG. 12. Data 860 is alternated with framing signals 862 and control signals. In the framing format shown in this figure, one control signal (off hook) 864 is sent for every eight data bits. The remaining seven bits in the frame of sixteen are used for frame synchronization. The illustrated framing signal is six ones followed by a zero in the control signal field. The data signal may be guaranteed to not have more than five ones in a row so that it will not be mistaken for a framing signal. Many other framing formats are possible to allow for different data signal properties and to permit the use of additional control bits.

Once the frame detect logic 844 detects six one's followed by a zero in the control signal field, mux control logic 848 is set to maintain the phase of the CK4 signal. If after a predetermined number of CK4 clock cycles a framing signal is not detected, then counter 850 will cause mux control logic 848 to change the phase of CK4 using mux 828 (FIG. 8). Counter 850 will then be reset, and frame detect logic 844 will again attempt to detect the selected framing signal so as to achieve synchronization. Only the correct phase of CK4 will achieve frame synchronization. Once frame synchronization is achieved, demux logic 846 can correctly decode control and data signals.

The specific structure and operation of frame detect logic 844, demux logic 846, and mux control logic 848 is dependent upon the selected framing format, the selected multiplexing scheme, and other design choices. The detailed design of this circuitry is within the ordinary skill in the art and is omitted from this description of a preferred embodiment.

Figure 9:
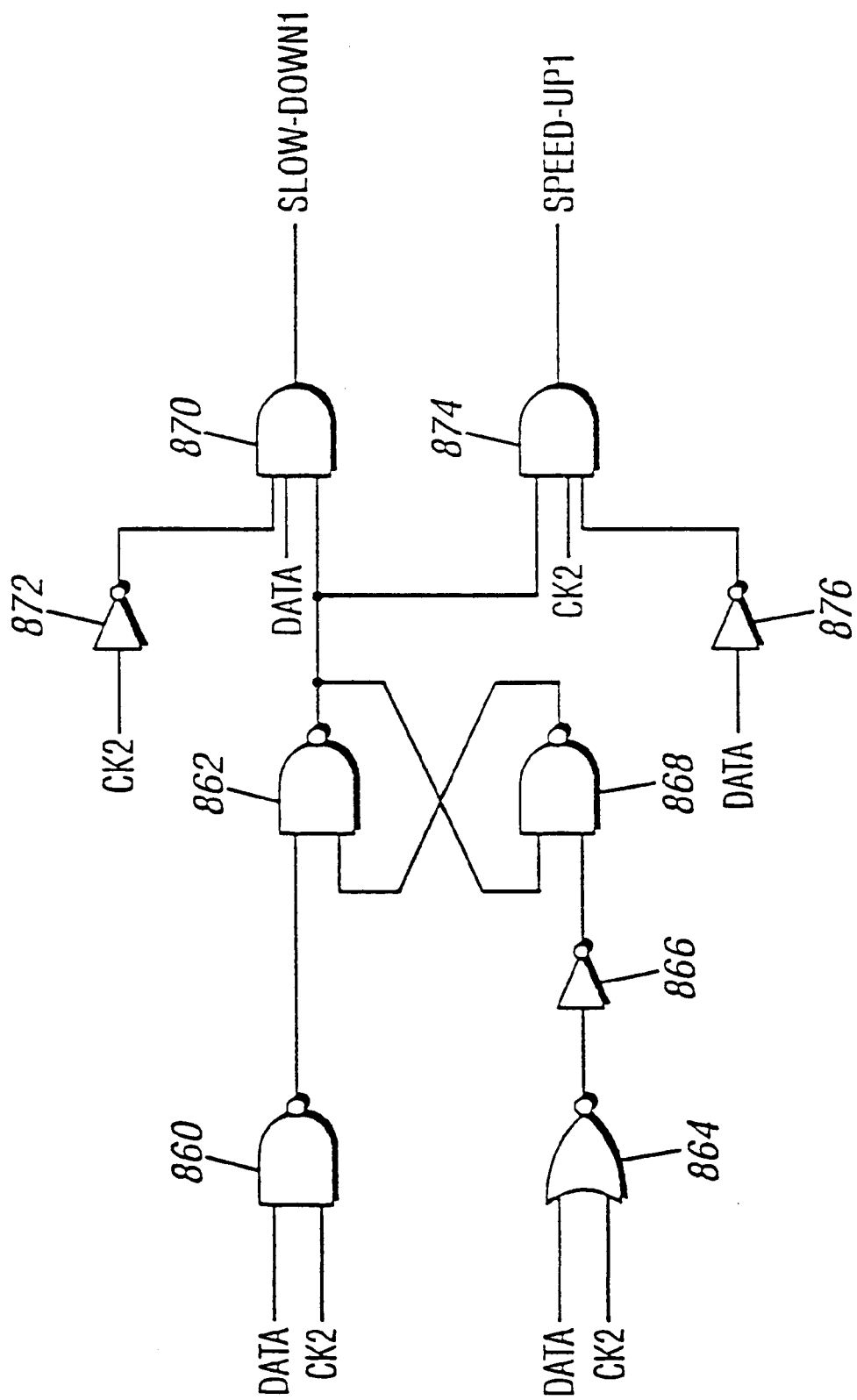
FIG. 9 is a schematic diagram of a phase detector circuit that may be used in a clock recovery circuit according to a preferred embodiment of the present invention.
Figure 10:
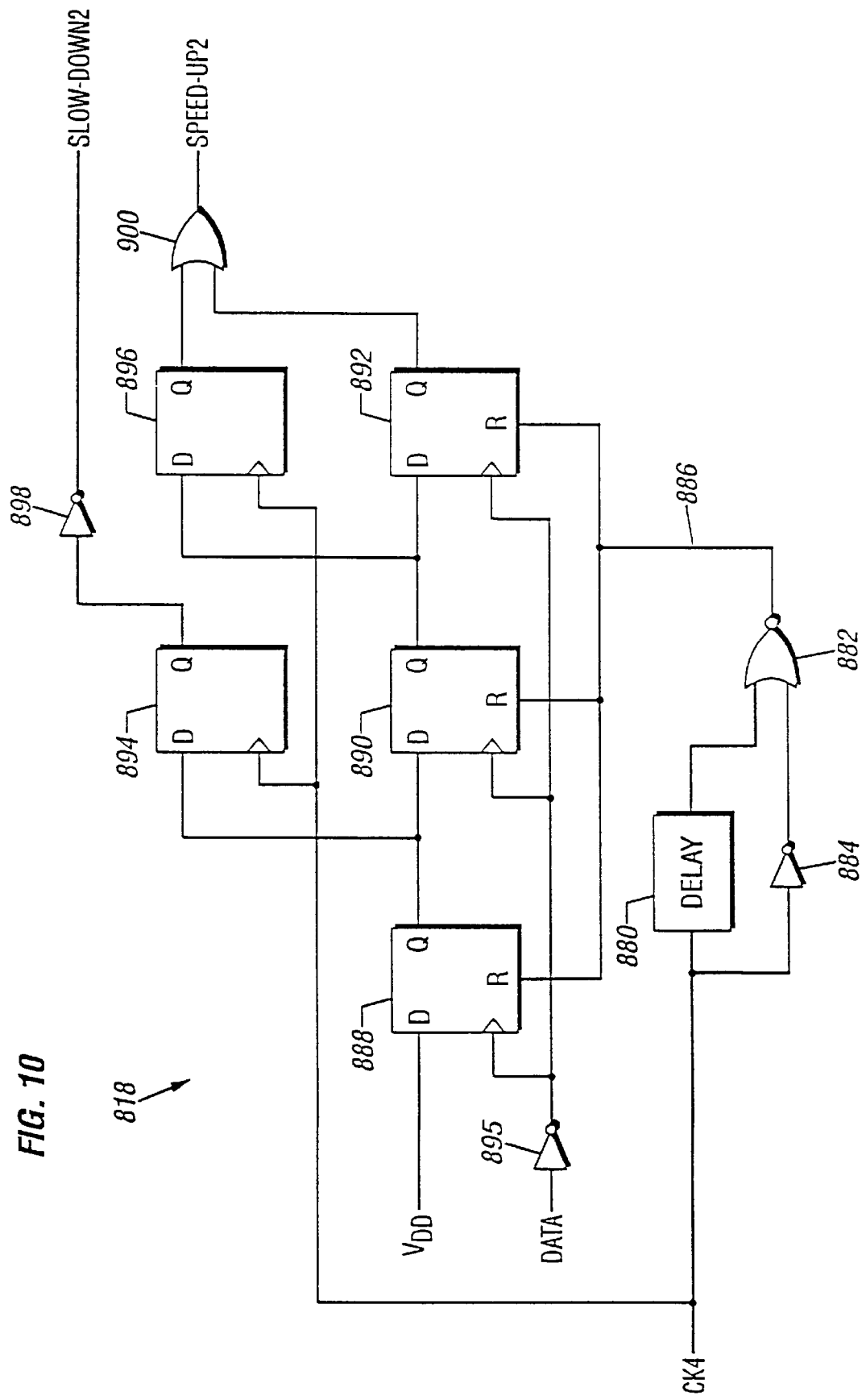
FIG. 10 is a schematic diagram of a frequency detector circuit that may be used in a clock recovery circuit according to a preferred embodiment of the present invention.

Exemplary embodiments of phase and frequency detectors 810, 818 are shown in FIGS. 9 and 10. Referring to FIG. 9, phase detector 810 has input signals CK2 and DATA and output signals SPEED-UP1 and SLOW-DOWN1. A two input NAND gate 860 has inputs DATA and CK2 and its output is connected to one input of NAND gate 862. A two input NOR gate 864 also has inputs DATA and CK2 and its output is connected to the input of inverter 866. A two input NAND gate 868 has one input connected to the output of the inverter 866 and one input connected to the output of NAND gate 862. NAND gate 862 has one input that is connected to the output of NAND gate 860 and the other input connected to the output of NAND gate 868. A three input AND gate 870 has one input connected to the output of inverter 872, another input connected to the DATA signal and another input connected to the output of NAND gate 862. The output of AND gate 870 is the SLOW-DOWN1 signal. The input of inverter 872 is connected to the CK2 signal. A three input AND gate 874 has one input connected to the output of NAND gate 862, another input is connected to the CK2 signal and another input is connected to the output of inverter 876. The output of AND gate 874 is the SPEED-UP1 signal. The input of inverter 876 is connected to receive the DATA signal.

In the illustrated embodiment, phase detector 810 compares the phase on the falling edges of DATA and CK2 after both signals are high at the same time. NAND gates 862 and 868 form a set-reset type latch. The latch gets "set" such that the output of NAND gate 862 is high when both the DATA and CK2 signals are high. The latch gets "reset" such that the output of NAND gate 862 is low when both DATA and CK2 are low. When the latch is "set" (i.e., both DATA and CK2 are high), AND gates 870 and 874 are enabled. Once the AND gates 870 and 874 are enabled they can compare the falling edges of CK2 and DATA to determine which signal goes low first. If DATA goes low first, then the SPEED-UP1 signal will go high until CK2 also goes low, indicating that oscillator 535 needs to oscillate faster in order to achieve phase alignment with the DATA signal. If the CK2 signal goes low first then the SLOW-DOWN1 signal will go high until DATA also goes low, indicating that oscillator 535 should oscillate slower in order to achieve phase alignment with the DATA signal. The SPEED-UP1 and SLOW-DOWN1 signals are connected to phase detector charge-pump 816.

A preferred embodiment of frequency detector 818 is shown in FIG. 10. The inputs to frequency detector 818 are the DATA and CK4 signals and the outputs are the SPEED-UP2 and SLOW-DOWN2 signals. Delay cell 880 has its input connected to CK4 and output connected to one input of NOR gate 882. The delay cell 880 consists of an even number of capacitively loaded inverter stages or other delay generating circuitry and is well known in the art. The output of inverter 884 is connected to the other input of NOR gate 882 and the input of inverter 884 is connected to CK4. The output 886 of NOR gate 882 is reset pulse that occurs on the rising edge of CK4, and is connected to the reset input of D flip-flops 888, 890, and 892. The input of inverter 895 is connected to DATA. The output of inverter 895 is connected to the clock input of D flip-flops 888, 890, and 892. The D input of flip-flop 888 is connected to $V_{DD}$. The D-input of flip-flop 890 is connected to the Q-output of flip-flop 888. The D-input of flip-flop 892 is connected to the Q-output of flip-flop 890. D flip-flops 894 and 896 have their clock inputs connected to CK4. The D input of flip-flop 894 is connected to the Q output of flip-flop 888. The D-input of flip-flop 896 is connected to the Q-output of flip-flop 890. The input of inverter 898 is connected to the Q-output of flip-flop 894, and the output of inverter 898 is the SLOW-DOWN2 signal. OR gate 900 provides the SPEED-UP2 signal. One input of OR gate 900 is connected to the Q-output of flip-flop 896, and the other input is connected to the Q-output of flip-flop 892. The SPEED-UP2 and SLOW-DOWN2 signals are connected to the frequency-detector charge pump 824.

The illustrated embodiment of frequency detector 818 counts the number of DATA pulses within one CK4 cycle. The frequency of CK4 should equal to the bit rate of the DATA pattern. Suitable encoding used for the DATA signal will ensure that there will be only one CK4 rising edge for each data pulse falling edge, if the frequency of CK4 is equal to the data rate. If the CK4 frequency is equal to the data rate then the Q-output of flip-flop 888 will be high prior to each rising edge of CK4 and the Q-outputs of flip-flops 890 and 892 will be low prior to each rising edge of CK4. If the Q-output of flip-flop 888 is low prior to the rising edge of CK4 then the SLOW-DOWN2 signal will go high for the duration of the next CK4 cycle, signaling that oscillator 535 should slow down. If the Q-output of flip-flop 890 is high prior to the rising edge of CK4, then the SPEED-UP2 signal will go high for the duration of the next CK4 cycle signaling that the oscillator should speed up.

Figure 14:
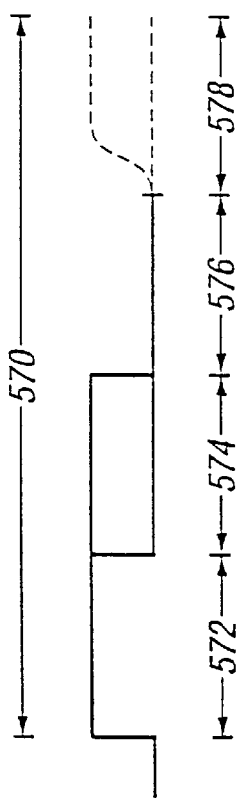
FIG. 14 is a timing diagram illustrating an alternative framing format that may be used in bidirectional embodiments of the present invention.

Another exemplary data coding scheme that may be used in an isolation system constructed in accordance with this invention is shown in FIG. 14. In this scheme, each bit period 570 is split into four fields. The first field 572 is referred to as the clock field and is always high independent of the data being transferred. The second field 574, which may occupy the second quarter of the bit period 570, contains the forward-going (from transmit side to receive side) data bit. This data bit can be either the delta-sigma data bit or a control bit or any desired type of encoding bit, in accordance with the requirements of the application in which the invention is used. The third field 576, which may occupy the third quarter of the bit period, is always low to ensure enough signal transitions to provide for power transmission in the forward path along with the first two fields, at least one of which is high in each bit period. The forward (transmit side) driver circuit is tri-stated during the fourth field 578, thus allowing for data transmission in the opposite direction across the isolation capacitor. Of course, this particular coding scheme is provided as an example, and many other coding schemes may be devised that will be operable in the various embodiments of the present invention.

It is desirable to use the logic "1" that is present at the beginning of each bit period for clock recovery, since it is always present at periodic intervals. However, if the reverse data bit from the previous bit period is a one, the rising edge at the beginning of the next bit period will not be readily seen by a logic gate and therefore will not be useful for clock recovery. To mitigate this effect and to allow reliable clock recovery, every fourth bit in the reverse field may be guaranteed to be zero by the encoding algorithms that are employed. The total frame length can be increased if more control bits need to be sent across the barrier in the reverse direction. Every fourth clock edge (the one associated with a zero in the previous reverse bit field) may then be used for clock recovery.

A block diagram of an exemplary PLL circuit that can perform clock recovery in accordance with the coding scheme of FIG. 14 is shown in FIG. 15. The forward data (conveyed from the transmit side to the receive side) is connected to divide-by-four counter 800. The output of counter 800 is connected to phase-frequency detector 801. The output of phase-frequency detector 801 is connected to charge pump 802. The output of charge pump 802 is connected to the input of loop filter 803. The output of loop filter 803 is connected to the input of voltage controlled oscillator (VCO) 804. The output of VCO 804 is the bit clock used for synchronizing the received data signal and for providing a clock signal to the receive side circuitry. The output of VCO 804 is also connected to the input of divide-by-four counter 805. The output of counter 805 is connected to the other input of phase-frequency detector 801. The phase-frequency detector 801 and the other circuits in the illustrated clock recovery circuit of FIG. 15 are well known in the art, and the specific circuitry selected for a particular application would be a matter of routine design choice.

Figure 16:
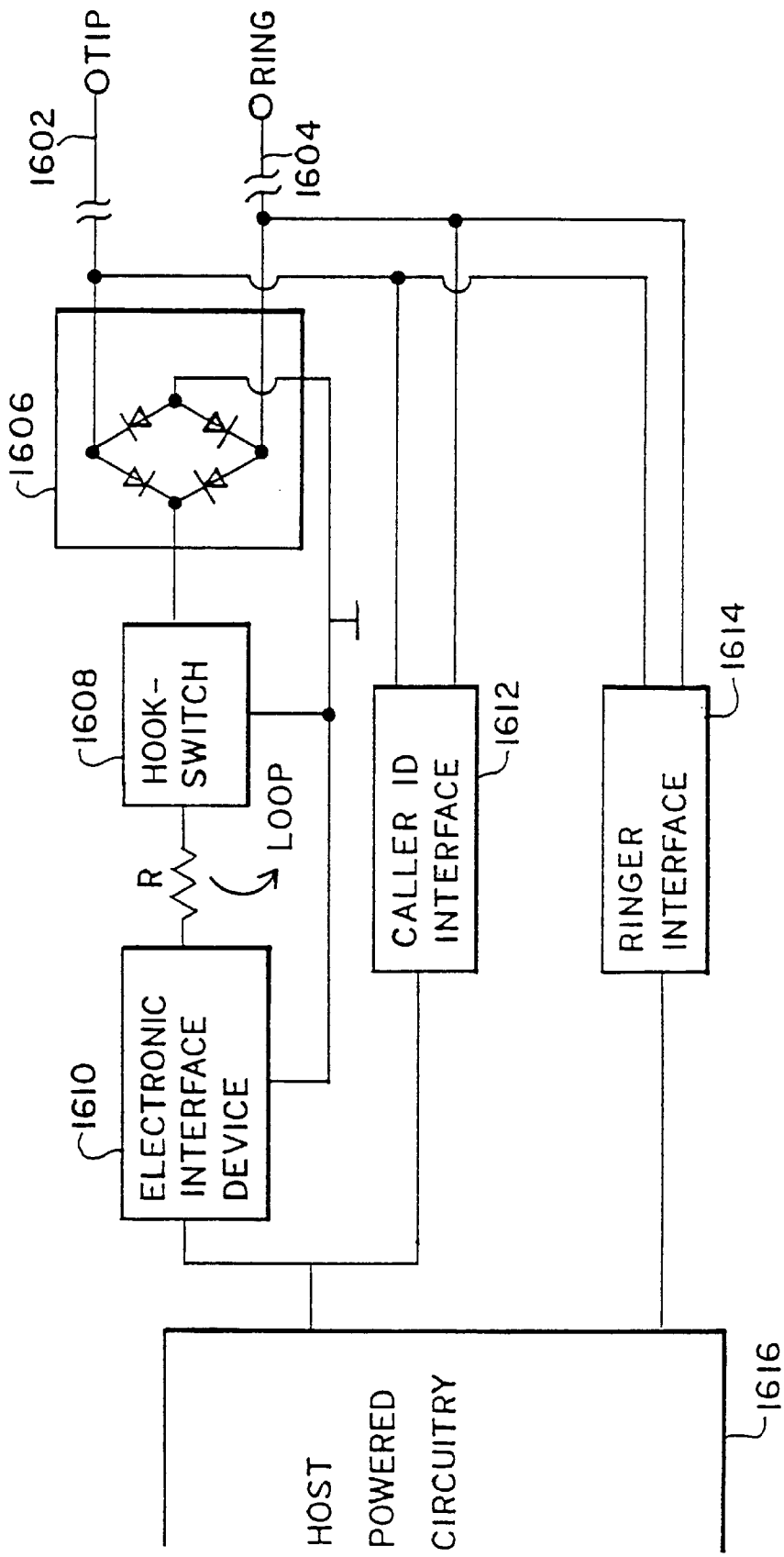
FIG. 16 is a prior art phone line termination circuit.
Figure 17:
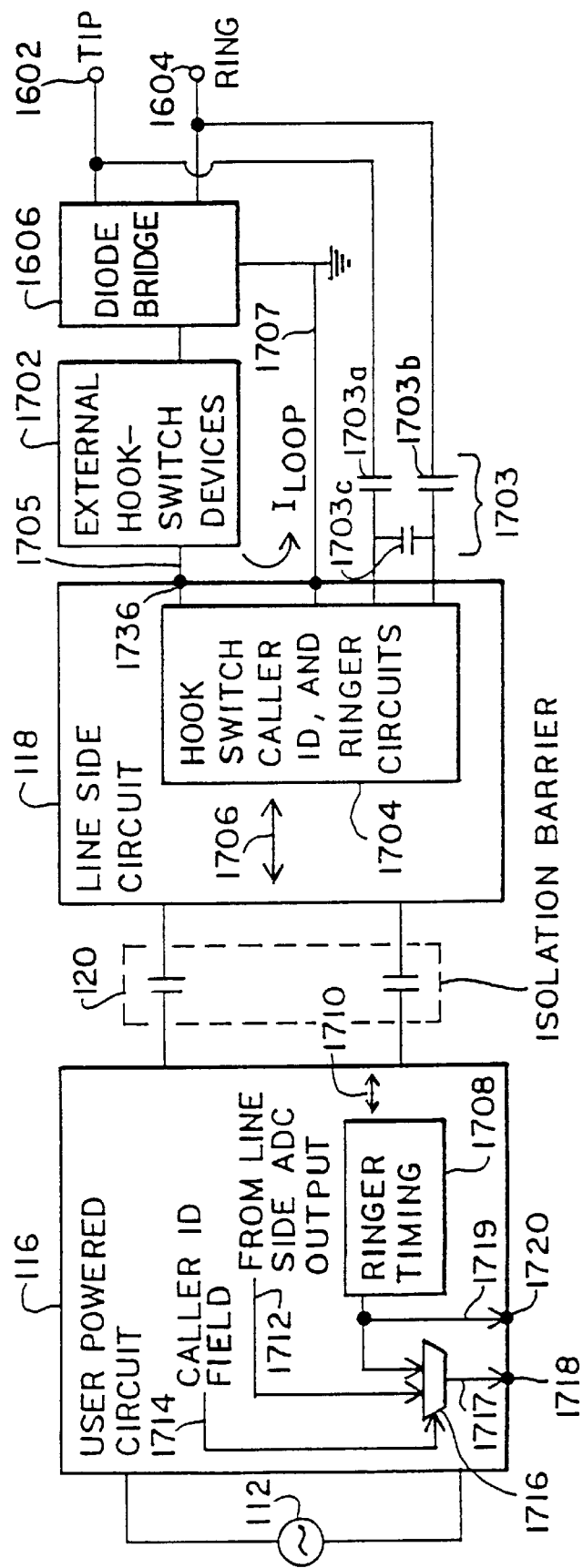
FIG. 17 illustrates a communication system according to the present invention.

As mentioned above with reference to FIG. 1, a typical application for isolation barriers is to isolate a communication system (such as a telephone, modem, etc.) from the public phone system. Moreover, as mentioned above with reference to FIG. 16, typical telephone systems utilize a number of undesirable features for implementing hookswitch interface, caller ID interface, and ringer interface functions. An improved telephone system utilizing capacitive isolation barriers and improved interface functions is described below with reference to FIGS. 17 and 18. As shown in FIG. 17, the TIP line 1602 and RING line 1604 are provided to the communication system 110. The diode bridge 1606 receives the TIP line 1602 and RING line 1604 and provides an output to the external hookswitch devices 1702. A communication line 1705 couples the external hookswitch devices to the line side circuits 118. The line side circuits 118 are circuits isolated from external powers sources, such as power source 112, by an isolation barrier 120. The isolation barrier 120 may be a capacitive isolation barrier as described above.

Phone line interface circuitry, such as a hookswitch, caller ID and ringer interface circuit 1704 is provided within the line side circuitry 118. The hookswitch, caller ID and ringer interface circuitry 1704 is coupled to the external hookswitch devices through line 1705 and ground through line 1707. The phone line loop current utilized by the line side circuits 118 is shown as $I_{loop}$. The hookswitch, caller ID and ringer interface circuitry 1704 is also coupled directly to the TIP line 1602 and the RING line 1604 through a capacitive interface 1703. The capacitive interface 1703 may be comprised of three high voltage (such as 300 V) capacitors 1703*a*, 1703*b*, and 1703*c* having capacitances of 2200 pF, 2200 pF and 5600 pF respectively. Bidirectional input/output lines 1706 may be provided from the hookswitch, caller ID and ringer interface circuitry 1704 for communication through the isolation barrier 120 to the user powered circuits 116.

The user powered circuits 116 may include ringer timing circuitry 1708. The ringer timing circuitry may bidirectionally communicate through line 1710 and the isolation barrier 120 to ringer circuits within the hookswitch, caller ID and ringer interface circuitry 1704 in the line side circuit 118. The ring detection output may be provided on output line 1719 to a ring detection output pin 1720 of the user powered circuit 116. Alternatively, the ring detection output 1719 may be provided at the ADC data port pin 1718 by use of a mux 1716. Mux 1716 may be utilized to multiplex the ringer detection output 1719 and a signal line 1712 containing caller ID data from an ADC output from the line side circuit 118. The mux 1716 may operate in response to a caller ID field signal 1714 so that when caller ID information is present on the TIP and RING lines, caller ID information is presented at the ADC data port pin 1718 and when ringing information is present on the TIP and RING lines, ring detection information is presented at the ADC data port pin 1718. In this manner the ADC data port may reflect activity on the TIP/RING loop during ringing, caller ID fields, and off-hook operations.

Figure 18:
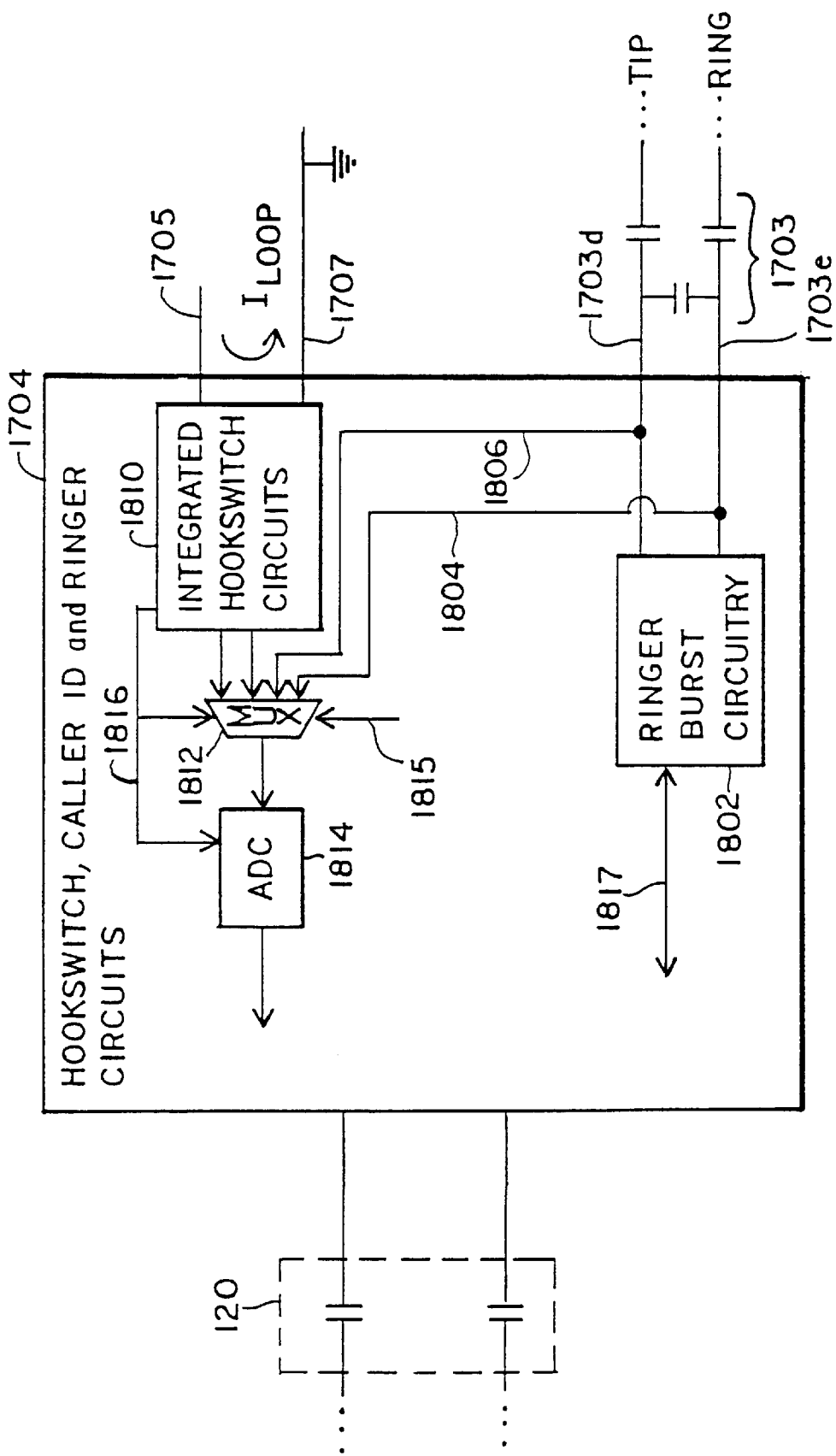
FIG. 18 illustrates hookswitch, caller ID and ringer circuits according to the present invention.

FIG. 18 illustrates a more detailed view of some of the circuits of the hookswitch, caller ID and ringer interface circuitry 1704. As shown in FIG. 18, input line 1705 provides the TIP and RING signal information to integrated hookswitch circuits 1810. The integrated hookswitch circuits 1810 are those portions of the hookswitch circuitry integrated within the line side integrated circuit 118 (as opposed to portions of the hookswitch circuitry which may be off chip as designated by the external hookswitch devices 1702 as shown in FIG. 17). The hookswitch circuitry is discussed in more detail below. The ground line 1707 is also coupled to the integrated hookswitch circuits 1810. The TIP and RING information is also coupled into the hookswitch, caller ID and ringer interface circuitry 1704 through a capacitive interface 1703. The TIP and RING information coupled through the capacitive interface 1703 may be provided to a ringer burst circuit 1802 and to a mux 1812. The mux 1812 operates in response to a control signal 1815. The control signal 1815 may be provided to indicate when caller ID information is present on the TIP and RING lines. Thus when caller ID information is present on the phone line, the caller ID information may be provided from the TIP and RING lines to an ADC 1814 for conversion to digital data which may then be transmitted across the isolation barrier 120. In other cases when caller ID information is not present (such as in an offhook situation), the mux 1812 may provide data from the integrated hookswitch circuits to the ADC 1814 for conversion to digital data which may then be transmitted across the isolation barrier 120. A power supply line 1816 may be provided to a variety of circuits such as the mux 1812 and the ADC 1814 from power obtained from the phone line through the hookswitch circuits. As discussed in more detail below, power may be supplied even in conditions when the hookswitch is not normally closed (an on-hook condition). Bidirectional communication from the ringer burst circuit 1802 to the user powered circuit 116 may be provided on communication line 1817 through the isolation barrier as also discussed below in further detail.

The communication system of FIGS. 17 and 18 allows for a number of advantageous system features to be utilized. Some of these features may be utilized independent of the use of an isolation barrier. In a preferred embodiment these features may be utilized in conjunction with a system that has a capacitive isolation barrier which allows for bidirectional digital communication across the isolation barrier. These advantageous system features are discussed below.

Low Voltage Line Side Circuits Powered by the Phone Line

In one embodiment, the communication system of FIGS. 17 and 18 allows for the use of a power supply budget such that portions of the line side circuit 118 may be powered from the telephone line while using standard electronic devices for the hookswitch circuits and the diode bridge circuit. Thus, expensive low voltage drop devices need not be utilized for the hookswitch devices and the diode bridge diodes as in the prior art. More particularly, at least some of the analog to digital converters and digital to analog converters (generally "converters" as used herein) utilized in the line side circuitry may be low voltage converters. As used herein a low voltage converter may generally be a converter operating at approximately 2.5 V or less, and more particularly at 2.0 V or less.

The power supply budget advantages of the use of such low voltage converters may be seen with respect to FIG. 17. The TIP line 1602 and the RING line 1604 typically provides both signal data and power by superimposing the signal data on a power supply voltage. A regulated voltage may be obtained from the power supply voltage and utilized for powering circuits such as analog to digital converters and digital to analog converters in the line side circuit 118. The maximum value of the regulated voltage that may be obtained will be dependent upon the voltage level at the line side circuit input 1736. The voltage level at input 1736 will in turn be dependent upon the voltage drop across the resistor R, the voltage drop across the external hookswitch devices 1702, the voltage drop across the diode bridge 1606 and the DC phone line voltage.

Typically in the United States, the DC phone line voltage measured at TIP and RING in an off-hook condition can be no greater than 7.7 V (at 20 mA loop current). If standard silicon p-n diodes are utilized for the diode bridge (0.7 to 0.8 V drop each) the maximum voltage drop across the diode bridge may be approximately 1.6 V. Further, if the hookswitch is formed with standard bipolar transistors an on-hook voltage drop of approximately 1 V will result. Finally, a typically resistance of 50 ohms used within the external hookswitch circuitry results in an additional voltage drop of 1 V. Thus, the average DC voltage at input 1736 may be approximately 4.1 V. However, the available voltage to generate a regulated voltage for use within the line side circuit is actually smaller as a result of a number of factors. First, the minimum instantaneous value of the voltage at input 1736 will be decreased by the maximum signal size of the data signal superimposed on the phone line voltage, thus further lowering the maximum regulated voltage value. Moreover, the line side circuit 118 often may exhibit a 5% variation in its ability to generate an regulated voltage. Thus, the maximum voltage for the regulated voltage generated may be approximately 2.5 V. In order to allow 0.5 voltage headroom to operate the voltage regulator in a preferred embodiment, the maximum regulated voltage may be 2.0 V. Assuming a 5% variation in the regulated voltage, the line side circuits to be powered from the phone line may be designed to operate at power supply voltage of 1.9 V +/−0.1 V.

Thus, a communication system is provided in which line side converters may be powered from the phone line while using standard hookswitch and diode devices without the need for expensive low voltage drop hookswitch and diode devices. For example, low voltage converters may be powered from the phone line. The low voltage converters may operate off a low voltage power supply of approximately 2.5 V or less, more preferably may operate off a low voltage power supply of approximately 2.0 V or less, and in one embodiment 1.9 V converters may be utilized. Moreover, the communication system disclosed herein allows for the generation of a regulated voltage through the hookswitch devices for use with low voltage circuitry within the line side circuits 118 during both on-hook and off-hook conditions as described below in more detail.

Capacitive Coupled Ring Detection Circuitry

In another embodiment, the communication system of FIGS. 17 and 18 provides a capacitive isolation barrier in which at least a portion of the ring detection circuits may be integrated into the line side circuit 118. Moreover the ring detection circuits on the phone line side of the isolation barrier may be powered at least in part by power transmitted from the powered side of the isolation barrier to the phone line side of the isolation barrier through the barrier capacitors.

The system shown in FIGS. 17 and 18 has at least a portion of the ring detection circuitry incorporated into circuits on the phone line side of the isolation barrier. As shown in FIGS. 17 and 18, the ringer burst circuitry 1802 may be included in the line side circuit 118. Because the ringer burst circuitry 1802 is integrated in the line side circuit 118, discrete opto-isolators and rectifiers are not needed for connection to the TIP/RING lines. Rather a capacitive interface 1703 may directly connect the ringer circuitry to the TIP/RING lines. Moreover, because the ringer circuitry is formed in integrated logic, the detector circuitry may be software programmable for the different ringer requirements of various countries, as opposed to discrete detectors which require external component changes to comply with each ringer requirement.

The capacitive interface 1703 operates to linearly attenuate the TIP/RING signal voltage levels from the high phone line levels to levels within integrated circuit technology limitations. More particularly, the interface linearly attenuates the TIP/RING signal at least over voltage ranges that would include the signal voltage ranges utilized for the caller ID field. For example, the capacitors 1703a and 1703b may be 300 V capacitors having capacitances of 2200 pF and 2200 pF respectively and capacitor 1703 may be a 5600 pF 50 V capacitor. This interface would linearly attenuate the TIP/RING signal by a factor of approximately 0.164. These capacitors may be discrete capacitors located off-chip of the integrated circuit line side circuit 118.

Such a capacitive interface (without being coupled to the line side integrated circuit) would then linearly attenuate the TIP/RING signal during ringing conditions from a typical 40 to 140 Vrms ring signal (for example with U.S. standards) to an approximately 7 to 23 Vrms input to the line side circuit 118. For the caller ID information which typically is less than 5 Vrms, the interface attenuates the caller ID information to a signal of less than 1 Vrms. The ring signal may be further attenuated by clipping the signal through the use of the integrated circuit input protection devices (ESD devices) such that, for example, any signal at the input to the line side integrated circuit 118 greater than approximately 4.2 V peak is clipped. Thus for voltage levels that include the maximum Caller ID voltage or less, the TIP/RING signal is linearly attenuated. In one embodiment, such a method for interfacing the TIP/RING signal may be implemented by selecting a ring detection threshold to be a TIP/RING signal of 18 Vrms or greater. Thus for a signal less than 18 Vrms on the TIP/RING line, a ring will not be detected and for a TIP/RING line voltage of greater than 18 Vrms a ring will be detected. At 18 Vrms, the TIP/RING line voltage will be attenuated by the capacitive interface to a signal of approximate 2.95 Vrms. Thus, the ring detector may be set to identify a ringing event if its input is greater than 2.95 Vrms. Any ringing signals which are clipped within the line side integrated circuit 118 will have exceeded the 18 Vrms TIP/RING threshold and be detected as a ringing event. In this manner the TIP/RING signals are input as linearly attenuated signals over the voltage ranges of significance and any signal which is non-linearly attenuated (clipped in this case) will have already surpassed the ring threshold and thus be detected as a ringing event.

Moreover because the ringer burst circuitry 1802 may be located on the line side of the isolation barrier, the interface 1703 does not require the use of expensive opto-isolators or other isolation barriers. Further, the ringer burst circuitry 1802 may be powered from power sources across the capacitive isolation barrier 120 because the capacitive isolation barrier 120 described above allows for the extraction of power from digital signals passed from the user powered circuit 116 to the line side circuit 118.

Separation of Ringer Detection Functions

A communication system such as shown in FIG. 17 generally must perform the a ring detection function. As mentioned above, the ringing bursts are time signals which may also include embedded caller ID information. Thus, the ring detection circuitry must generally perform a number of functions including detecting ringing bursts, generating logic timing signals indicating the location of the caller ID data between the first and second ring burst, and generating logic timing signals indicating the end of an ring event. Typical prior art ring detection circuits implemented all of the ring detection functions through circuits placed on the powered side of the isolation barrier (a barrier such as an opto-isolator/rectifier circuit).

However as shown in FIGS. 17 and 18, the communication system 110 of the present invention may utilize ring detection circuitry on both sides of the isolation barrier 120. More particularly, the ring detection circuitry may include ring burst circuitry 1802 on the phone line side of the isolation barrier (within line side circuit 118) and ringer timing circuits 1708 on the powered side of the isolation barrier (within user powered circuit 116). The ring burst circuitry 1802 detects ring bursts on the TIP/RING lines and converts the bursts into a logic signal representing the burst peaks. The digital burst peak signal may then be transmitted on output line 1817 through the isolation barrier 120 to the ringer timing circuits 1708. The ringer timing circuits 1708 then perform the timing functions such as identifying the location of the caller ID field and the end of ringing. The outputs of the ringing timing circuits may then be provided to circuits on either side of the isolation barrier. For example, output 1719 of the ringer timing circuit 1708 may be presented to output pins of the user powered circuit 116 and the ringer timing circuit 1708 may also generate the caller ID field signal 1714 utilized in the user powered circuit 116. Further, timing signals may be transmitted back across the isolation barrier, such as for example, the control signal 1815 which is utilized in the line side circuit 118.

The division of the ring detection circuitry between both sides of the isolation barrier provides advantageous features. Generally it is desirable to minimize the circuitry on the line side of the isolation barrier so as to decrease the amount of power which must be transmitted across the isolation barrier and to minimize common-mode noise which may be transmitted to the TIP/RING lines. By splitting the ring detection circuitry so that the ringer timing circuits 1708 are placed on the powered side of the isolation barriers, a significant reduction in the power usage on the phone line side of the barrier related to the ring detection function may occur. Moreover, the use of the ringer burst circuitry 1802 and the capacitive interface 1703 allows for transmission of a digital signal indicative of ringer bursts across a capacitive isolation barrier rather than more expensive barriers such as opto-isolators. Thus, the ring detection function may be accomplished in a system utilizing an efficient bidirectional capacitive barrier while still minimizing power usage on the line side of the barrier.

The ringer burst circuitry 1802 receives attenuated TIP and RING data on signal lines 1703d and 1703e as shown in FIG. 17. In one example, the ringer burst circuitry may be comprised of a four input comparator, receiving the two signal lines 1703d and 1703e as a differential signal input and two reference voltage lines as a differential voltage reference for the comparator. The voltage reference may be selected to serve as a predetermined ringing threshold level. If the TIP/RING voltage exceeds the set threshold level, then a ringing burst peak has occurred and the comparator output is a first digital state. If the TIP/RING voltage is less than the set threshold, then a ringing burst peak has not occurred. The output of the comparator may then be transmitted on communication line 1817 across the isolation barrier to the powered circuit 116. The voltage reference for the comparator may be set by providing $V_{DD}$ and ground inputs to the comparator so that the voltage reference may be between 3.5 V and 5.0 V (4.2 V in one embodiment) depending upon the digital $V_{DD}$ level utilized. The ringer timing circuitry 1708 may be implemented through the use of a digital state machine. The state machine input may be the digital ringer burst peak signal (the output of the comparator). In response to the ringer burst signal, the state machine may indicate ringing if bursts are detected, indicate a caller ID field if ringer has ceased for approximately 0.5 seconds (the period between a ringing burst and a caller ID field), and indicate that ringing has ceased if an approximately 5 second non-ringing period is detected after the last ringing burst.

Using Ringer Inputs for Caller ID Data

As described above, the TIP signal 1602 and RING signal 1604 may be provided to the ringer circuitry as a linear output of the capacitive interface 1703. Because the interface 1703 provides a linear signal (as opposed to traditional ringer interface methods such as opto-isolators which are non-linear), the input provided to the ringer burst circuitry 1802 may also be utilized for other functions in addition to ringer detection functions. More particularly, the outputs 1703d and 1703e of the capacitive interface 1703 may also be connected to caller ID circuitry input lines 1804 and 1806.

Thus, as shown in FIG. 18, accurate caller ID data from the TIP/RING signals may be present on caller ID input lines 1804 and 1806. The caller ID information is then provided from lines 1804 and 1806 to a mux 1812. The mux 1812 also receives a caller ID field signal 1815 that indicates when caller ID information is present on the TIP and RING lines. Thus when caller ID information is present, the caller ID data may be transmitted from lines 1804 and 1806 to an analog to digital converter 1814 for conversion of the caller ID data to digital signals. During off-hook operations the mux 1812 may transmit the off-hook data from the integrated hookswitch circuits 1810 to the analog to digital converter 1814.

The use of common inputs for the ringer circuitry and the caller ID circuitry eliminates the need for a separate caller ID interface. Moreover since the voltage levels on the lines 1804 and 1806 are within standard integrated circuit technology limitations (used with typical 5.0 V, 3.3 V, or less logic), the requirement for separate (and expensive) high voltage switches for inputting caller ID data is eliminated. Thus, the techniques shown herein lower both costs and system board space usage.

Loop Current During Ringing

As shown with respect to FIGS. 17 and 18 loop current ($I_{loop}$) may be drawn from the TIP line 1602 and the RING line 1604. However, various standards such as the FCC part 68 standard limit the amount of dc current drawn from the phone line during various states. One figure of merit in the FCC part 68 standard is the "Ringer Equivalence Number" (REN) and one measure of the REN is the current drawn from the TIP/RING lines during ringing. During ringing (an on-hook state) the REN is defined as:

REN=(maximum dc current during ringing)/(600 uA)

and the maximum allowed REN value is 5 for each phone line. It is desirable that any one communication system (for example a telephone or modem) connected to the phone line have a low REN so that more communications systems can be connected to the same phone line without the cumulative total REN exceeding the set standard.

The architecture shown with respect to FIGS. 17 and 18 provides a system which draws virtually no (less than 10 uA) loop current during a ringing burst and only draws on-hook loop current during the caller ID field. More particularly, as noted above the ringer burst circuitry 1802 may be powered from the powered circuitry 116 by the transmission of power across the isolation barrier. Thus, loop current need not be drawn from the TIP/RING lines during ringer bursts. Furthermore, the ADC 1814 and associated circuitry may be powered down during on-hook conditions (and thus draw no loop current) except during the caller ID field. During the caller ID field, current may be drawn from the TIP/RING lines to power the ADC 1814 as described in more detail below. Thus, during on-hook conditions the system shown herein draws virtually no loop current to operate the ringer burst circuitry 1802 and powers the ADC 1814 down except during the caller ID field.

The technique discussed herein to minimize the loop current during ringer bursts and caller ID fields may still be utilized even when a user desires that the ring detector output signal be present at the ADC output port pin of the user powered circuit 116. As discussed above, the ring detection output signal 1719 may be multiplexed through mux 1716 in order to provide the ring detection output signal 1719 at the ADC output port pin 1718. Because of this multiplexing, the ring detection output may be presented at the ADC output port pin 1718 even though the ADC is powered down and not drawing loop current during ringing. Thus, an architecture is provided which minimizes the loop current drawn during ringing while still providing user flexibility as to data pin out.

Caller ID Circuits Powered Through Hookswitch Devices

As described above, in prior art communication systems external bipolar high voltage transistors may be utilized as hookswitches. During an on-hook condition these prior art switches may typically be turned off thus not allowing loop current to be drawn from the phone line. During an off-hook condition, the switches may be placed in saturation and act as a switch that "seizes" or "collapses" the phone line, i.e. draws all the available phone line current.

The communication system disclosed herein allows for the hookswitch devices to draw loop current from the phone line in both on-hook and off-hook conditions. Thus, even though an on-hook condition occurs, current may be obtained through the hookswitch devices. This feature allows circuitry which operates during on-hook conditions to still receive power from the phone line. Moreover because the hookswitch devices are utilized for drawing power in both on-hook and off-hook conditions, the use of additional switches dedicated to drawing the power during on-hook conditions is not required. For example, caller ID circuits generally operate during an on-hook condition. By utilizing the techniques disclosed herein, loop current may be drawn from the phone line through the hookswitch devices to power circuits used to perform the caller ID function, such as for example, the ADC 1814 as shown in FIG. 18. Thus, separate external high voltage caller ID switches are not required. Because the caller ID circuitry may not require as much current as is typically drawn during an off-hook condition, the hookswitch circuits may be said to be drawing power from the TIP/RING phone lines in a low power mode during the caller ID operation and in a full power mode during the off-hook conditions.

The technique disclosed herein for drawing current through the hookswitch devices is particularly useful for communications systems which utilize a capacitive isolation barrier system. For example, hookswitch control circuits on the phone line side of the isolation barrier may be powered at least in part by power transmitted across the isolation barrier. In particular, a power supply in the line side circuits 118 may be powered by transmissions across the isolation barrier and this power supply be utilized to provide start up (or activation) power to the hookswitch circuitry. Once the hookswitch circuits are started up or activated by power from the user powered circuitry 116 (across the isolation barrier), the hookswitch circuits may then commence drawing loop current from the TIP/RING phone lines to fully power the hookswitch circuits. This use of start up or activation power provided from across the isolation barrier may be utilized for drawing current through the hookswitches during both on-hook (such as caller ID) and off-hook conditions.

Figure 19:
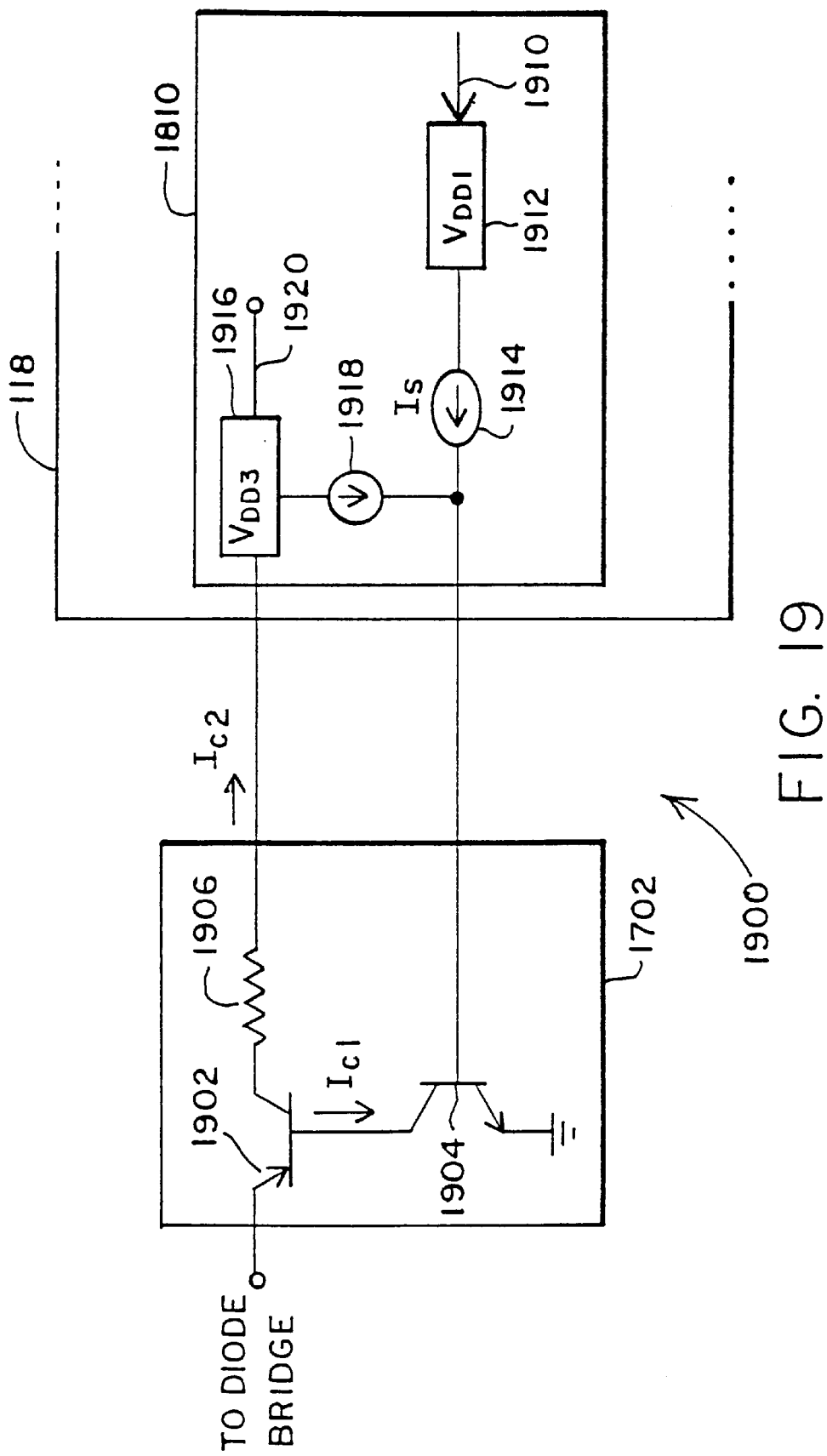
FIG. 19 is an illustrative embodiment of hookswitch circuitry.

The circuit of FIG. 19 is an illustrative circuit for demonstrating the activation of the hookswitch circuitry. A more detailed embodiment of the hookswitch circuitry demonstrating both a low power (caller ID) mode and a full power (off-hook condition) mode will be discussed with reference to FIGS. 20 and 21. As shown in FIG. 19, the hookswitch circuit 1900 may include circuitry external to the line side circuit 118 and circuitry integrated within the line side circuitry 118. Using the same nomenclature as used in FIGS. 17 and 18, these circuits may be identified as the external hookswitch devices 1702 and the integrated hookswitch circuits 1810. The external hookswitch devices 1702 may include a resistor 1906 and high voltage bipolar transistors 1902 and 1904. Current from the base of transistor 1902 to the collector of transistor 1904 is shown as $I_{c1}$ and the current from the collector of transistor 1902 is show as $I_{c2}$. The integrated hookswitch circuits 1810 include a $V_{DD1}$ power supply 1912 that delivers a start up current 1914 ($I_s$) The power supply 1912 is generated from power passed across the isolation barrier as indicated by power supply input line 1910. The current $I_s$ is provided to the base of transistor 1904. When it is desirable to commence drawing current from the TIP/RING lines (through the diode bridge), power is transmitted across the isolation barrier so that the current $I_s$ can be delivered to the base of transistor 1904. This then begins to turn on transistor 1902 so that loop current can be drawn from the TIP/RING lines. As transistor 1902 turns on, the current $I_{c2}$ may then be used to generate a $V_{DD3}$ voltage supply 1916. The $V_{DD3}$ power supply 1916 may be used to deliver a current 1918 which further turns on transistor 1902. As transistor 1902 turns on, the power supply 1916 also may power up other portions of the hookswitch circuitry through output line 1920. In this manner power transmitted across the isolation barrier may be used to start up or activate the hookswitch devices. Then the feedback loop begins to more fully turn on the transistor 1902 until the desired power supplied from the phone line may be provided.

Figure 20:
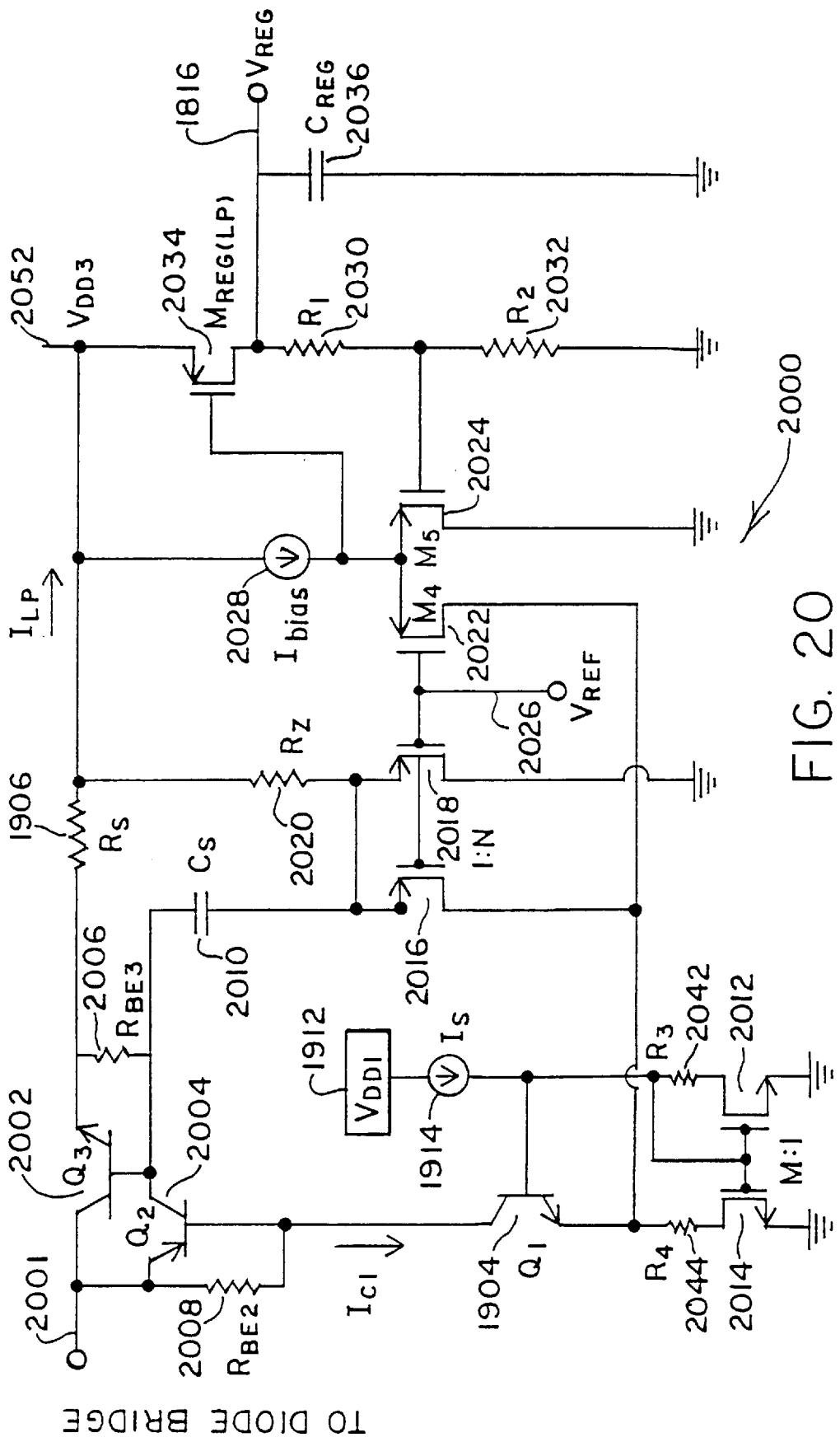
FIG. 20 is a hookswitch circuit according to the present invention as operating in a low power mode.
Figure 21:
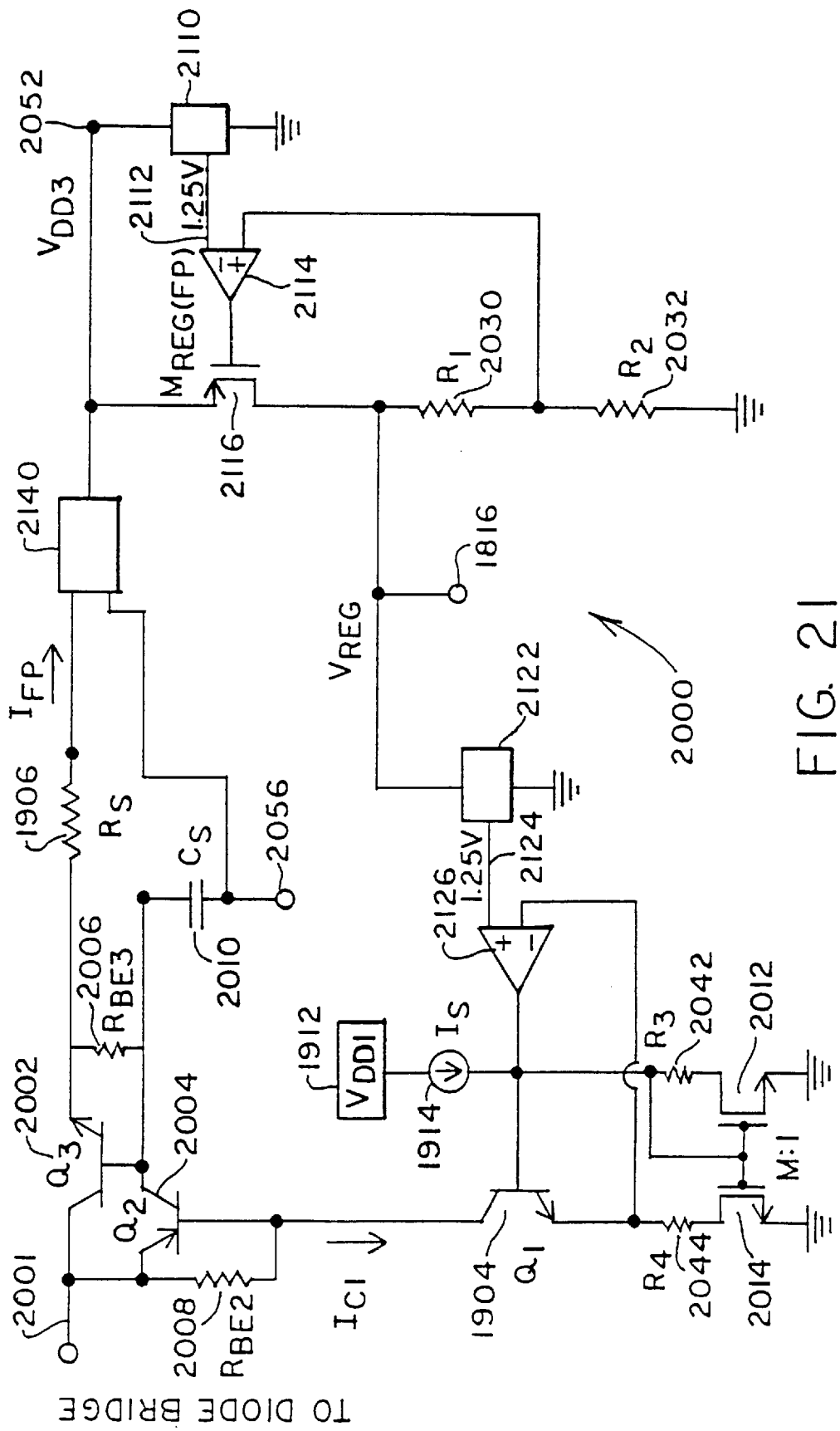
FIG. 21 is a hookswitch circuit according to the present invention as operating in a full power mode.

An improved hookswitch circuit 2000 for performing techniques similar to those described above is shown in further detail in FIGS. 20 and 21. FIG. 20 illustrates the circuit 2000 during on-hook conditions where loop current is drawn to power caller ID circuitry. FIG. 21 illustrates the circuit 2000 during full power off-hook conditions. The circuit of FIGS. 20 and 21 includes the circuit elements that form both the external hookswitch devices 1702 and the integrated hookswitch devices 1810 of FIGS. 17 and 18. More particularly, the external devices of FIGS. 20 and 21 include transistor switches 1904, 2002, and 2004, resistors 1906, 2006, and 2008, and capacitor 2010. The external devices are coupled to the TIP/RING lines (through a diode bridge) at input 2001. Transistors 1904, 2002, and 2004 may all be high voltage bipolar transistors. As shown in FIGS. 20 and 21, transistors 2002 and 2004 may be connected in a complimentary Darlington configuration. This Darlington configuration may be utilized in place of the single transistor 1902 as shown in FIG. 19. Typical resistance and capacitance values for the external devices are: $R_s$=51 Ω, $R_{BE2}$=$R_{BE3}$=30 KΩ, and $C_s$=0.47 μF. The resistors 2006 and 2008 serve several purposes. These purposes include limiting the effective low-current (i.e. the during the low power caller ID mode) β's of the transistors 2002 and 2008 and keep low-current bandwidth of the transistors high. Further the resistors improve breakdown behavior beyond $V_{BCEO}$. The resistor 1906 ($R_s$) establishes the proper off-hook D.C. I/V characteristics. The capacitor 2010 $C_s$ couples the off-hook analog input signal (as discussed in further detail below) to the circuitry which utilizes the off-hook signal. Thus, the phone line signal in full power off-hook mode is obtained from the base of transistor 2002 through capacitor 2010. The resistor 1906 and capacitor 2010 also help create off-hook inductive behavior.

The remaining portions of the circuitry of FIGS. 20 and 21 may be formed in the integrated circuitry. As with the circuit of FIG. 19, the $V_{DD1}$ power supply 1912 is generated from power transmitted across the isolation barrier and delivers a start up current 1914 ($I_s$) to the base of transistor 1904. The creation of the $V_{DD1}$ power supply by transmissions across the isolation barrier may be performed by utilizing the isolation barrier active diode bridge techniques described above, for example with reference to FIGS. 2, 6A and 6B. In one embodiment, the start up current $I_s$ may be approximately 5–12 uA for both the low power and full power modes.

In low power caller ID mode, it is desirable in accordance with the present invention to utilize the same switches as utilized in the full power off-hook mode. Thus transistors 1904, 2002, and 2004 which are the switches used in the full power off-hook mode are also used in the low power caller ID mode. However, in caller ID mode it is desirable to only draw a limited amount of current from the TIP/RING phone lines as drawing excessive current would falsely indicate to the phone system central office that the communication system has gone off-hook. Thus, the hookswitch circuitry should include circuitry that when in caller ID mode keeps transistors 2002 and 2004 from turning on hard, and instead, draws only the current required by the caller ID circuitry. It is particularly important to limit the current drawn during the start up of the caller ID mode as start up transient currents may be falsely indicate an off-hook condition.

The circuit of FIG. 20 will provide the necessary low power functions. More particularly, with the $I_s$ current of approximately 5–12 uA generated from power provided across the isolation barrier, a low power current of $I_{LP}$ of approximately 800 uA may be drawn from the TIP/RING phone lines to provide current to power on-hook circuits (such as caller ID) while not falsely indicating an off-hook condition. Because the 5–12 uA $I_s$ base current provided to transistor 1904 will generate a low power current $I_{LP}$ in excess of 800 uA, the remaining circuitry of FIG. 20 is provided so as to limit the low power current $I_{LP}$ to the desired range. More particularly, current through transistor 1904 is limited by the $I_{bias}$ current 2028, transistor 2022 and transistor 2014. This in turn decreases the low power current $I_{LP}$. To achieve the desired low power current $I_{LP}$, $I_{bias}$ may be set to approximately equal to (M)($I_s$), wherein M is the size of transistor 2014 relative to transistor 2012 and M=12. Power may then be supplied to the caller ID circuitry (or other on-hook mode circuitry) by coupling that circuitry to the $V_{REG}$ low power output node 1816 (also see FIG. 18). The $V_{REG}$ output node 1816 may be coupled to the $V_{DD3}$ node 2052 through transistor 2034 ($M_{REG(LP)}$) It is desirable for $V_{REG}$ voltage to be established with bandgap reference precision, and in steady state the $V_{REG}$ voltage may be $$V_{REG} = \left(1 + \frac{R_1}{R_2}\right) \cdot V_{REF}.$$

Thus, a voltage supply is provided for use in on-hook circuitry by the use of the off-hook switches. In one embodiment, $V_{REG}$ may be approximately 1.9+/−0.1 V.

During low power modes (when the hookswitch is operating in a forward active region during the caller ID mode), the use of the Darlington configuration of transistors 2002 and 2004 increases the current feedback loopgain (as opposed to a circuit such as in FIG. 19). Thus, the hookswitch circuitry must keep the current feedback loop stable even in the presence of variations in the β's of the bipolar transistors 1904, 2002, and 2004 and the corresponding variations in the −3 dB current gain bandwidth of the transistors. The use of capacitor 2010 ($C_s$) at the base of transistor 2002 helps achieve the necessary circuit stability because when the external transistors are not in saturation the capacitor stabilizes the high gain feedback of the circuit. The capacitor 2010 ($C_s$) helps to stabilize the caller ID feedback regulator loop by rolling off the loopgain at the base of transistor 2002. Transistor 2002 then effectively becomes an emitter follower for loopgain. This connection of capacitor 2010 ($C_s$) to the base of transistor 2002 for off-hook input signal coupling is desirable to avoid the excess current gain introduced by transistor 2002 as may occur with connection of the capacitor to the emitter of transistor 2002. Thus, although in normal off-hook mode (transistor 2004 saturated, transistor 2002 diode-connected), the analog input signal can be coupled through capacitor 2010 from either the emitter or base of transistor 2002, the capacitor is more effective at establishing a dominant pole in caller ID mode if the capacitor is connected to the base of transistor 2002.

The 1:N feedback from transistor 2016 to the emitter of transistor 1904 limits the transient current in transistor 2004 caused by the step turn-on of the $I_s$ current 1914. The impedance of transistor 2018 then introduces a loopgain zero; $C_s$ rolls off the loopgain, but reaches a finite limit imposed by the transconductance of the transistor 2018. The voltage regulator capacitor 2036 ($C_{REG}$) then takes over, rolling off the loopgain to the emitter of transistor 1904. Transistor 1904 operates approximately in common base mode, avoiding excessive current gain (and low frequency poles) associated with common emitter configurations. Typical values for the size of transistor 2014 (M) are M=12 and typical values for the size of transistor 2018 (N) are N=34. Transistors 2022 and 2024 may be 1:1 sized. Other circuit element values may be approximately $V_{ref}$=1.2V, resistor 2044 ($R_4$)=300 Ω, resistor 2042 ($R_3$)=50 kΩ, resistor 2030 ($R_1$)=70 kΩ, resistor 2032 ($R_2$)=120 kΩ, resistor 2020 ($R_z$)=1 kΩ, and $C_{reg}$=0.05 μF.

The load on $V_{REG}$ may include the analog-to-digital converter (ADC) 1814 (see FIG. 18) which is utilized to convert the caller ID information on the phone line signal to digital form for transmission across a capacitive isolation barrier 120. Since the hookswitch is not turned on hard in caller ID mode, the phone line signal is not available through capacitor $C_s$. Instead, the ADC 1814 powered through the $V_{REG}$ output 1816 receives the caller ID signal through the capacitive interface 1703 and mux 1812 (see FIG. 18 and description above) which are coupled directly to the TIP line 1602 and the RING line 1604.

In full power off-hook mode, the Darlington configuration of transistors 2002 and 2004 operates such that transistor 2004 saturates, effectively diode connecting transistor 2002. This configuration provides some immunity to quasi-saturation effects, allowing a 0 dBm signal to pass with low distortion as opposed to the use of a single transistor as shown in FIG. 19. When going off-hook, it is desirable that the hookswitch circuitry saturate transistor 2004 and diode connect transistor 2002 without forcing excessive $I_{c1}$ current since excessive $I_{c1}$ would diminish the available loop current at node $V_{DD3}$ for use in other portions of the communication system. Setting $I_{c1}$ to approximately 4 mA is sufficient to saturate the Darlington transistor pair while not excessively diminishing the available loop current.

The configuration of the hookswitch circuit 2000 during full power off-hook mode is shown in FIG. 21. During off-hook conditions some of the circuit elements of the hookswitch circuit remain configured the same as in the on-hook mode as shown in FIG. 20. However as further shown in FIG. 21, in the off-hook mode some of the circuit elements of the hookswitch circuit 2000 are disconnected as compared to the on-hook mode and additional circuitry may be connected as described below.

As shown in the off-hook full power mode of FIG. 21, the full power current $I_{FP}$ may be provided from the phone line through resistor 1906. In full power mode, the resistor 1906 may be coupled to a $V_{DD3}$ generator 2140 for providing a $V_{DD3}$ voltage on node 2052. The $V_{DD3}$ generator 2140 may be configured as shown in the related U.S. application No. 09/034,683 entitled "External Resistor and Method to Minimize Power Dissipation In DC Holding Circuitry For A Communication System" by Scott et al., filed concurrently herewith and incorporated herein by reference. Using $V_{DD3}$, a reference voltage 2112 of 1.25 V may be generated from a bandgap voltage reference 2110. The reference voltage 2112 in turn is provided to an op amp 2114 which is coupled to the gate of transistor 2116 ($M_{REG(FP)}$). The transistor 2116 ($M_{REG(FP)}$) is utilized in the full power mode and is connected between the $V_{DD3}$ node 2052 and the resistor 2030. Similarly, a different transistor 2034 ($M_{REG(LP)}$) (see FIG. 20) is utilized in the low power mode and is connected between the $V_{DD3}$ node 2052 and the resistor 2030. Depending upon whether the circuit is operating in the full power or low power modes, one of the two parallel connected transistors (2116 or 2034) will be turned off by pulling its gate high as explained in more detail below.

As shown in FIG. 21, the drain of transistor 2116 may be coupled to the $V_{REG}$ node 1816 and resistors 2030. The resistor 2032 is coupled to resistor 2030. The $V_{REG}$ node 1816 may be utilized as a voltage source for powering circuitry in the phone line side circuitry as also shown in FIG. 18. Thus, a voltage output at node 1816 may be coupled to other circuitry utilized during off-hook conditions such as analog to digital converters, digital to analog converters, etc. By comparing FIGS. 20 and 21, it may be seen be that the same $V_{REG}$ node is utilized in both full power and low power modes to power the other line side circuitry (for example the ADC 1814). However, it will also be noted from FIGS. 20 and 21 that the method of controlling the $V_{REG}$ node varies depending upon whether the system is in the full power off-hook mode or in the low power caller ID mode.

With reference again to FIG. 21, a bandgap voltage reference 2122 generates a voltage output 2124 of 1.25 V which may be provided to the op amp 2126. The output of the op amp 2126 is coupled to the base of transistor 1904. The $I_s$ current source 1914 is also coupled to the base of transistor 1904. An input of the op amp 2126 is also coupled to the transistor 1904 as shown. Both op amps may be powered from the $V_{DD3}$ node which is generated from power supplied from the phone line.

By utilizing a 1.25 V input to the positive input of the op amp 2126 and utilizing a 300 Ω resistor as the resistor 2044, the necessary op amp output is provided to the transistor 1904 to set $I_{c1}$ to approximately 4 mA (which in turn will be sufficient to saturate the Darlington transistor pair while not excessively diminishing the available loop current). More particularly in the full power mode, the op amp 2126 pulls the base of the transistor 1904 to approximately 2 V (thus keeping the emitter of the transistor at approximately 1.25 V). The transistors 2012 and 2014 then have the 2 V voltage applied to their gates which turns on the transistors so that their drains are almost pulled to ground, in which case the $I_{c1}$ current of approximately 4 mA results (1.25 V/300 Ω). In the low power mode (FIG. 20), however, the transistors 2012 and 2014 act as a 1:M current mirror since the voltage drops across the resistors 2042 and 2044 are small enough to keep the transistors 2012 and 2014 saturated.

As shown in FIG. 21, the reference voltage input of the op amp 2126 is provided from the bandgap reference circuit 2122 (powered by the regulated voltage $V_{REG}$). This is done because there is a large signal from the phone line riding on the $V_{DD3}$ node 2052. $V_{REG}$ is therefore provided as a relatively quiet voltage node to be used to power the band gap reference circuit 2122 and thus improve the power supply rejection characteristics of the circuit.

The hookswitch circuitry 2000 may be switched back and forth between the full power and low power mode depending upon whether the communication system is in a caller ID mode or off-hook mode. More particularly, a control signal may be generated in the user powered circuitry 116 when a phone is taken off-hook. This control signal may then be passed across the isolation barrier 120 to the line side circuit 118. In response to the control signal, the node 2052 will be either connected to resistor 1906 for the low power mode as shown in FIG. 20 (without voltage generator 2140) or will be connected through the voltage generator 2140 for the full power mode as shown in FIG. 21. Furthermore, during low power operations the op amp 2114 (see FIG. 21) is turned off to pull the gate of the transistor 2116 high to turn off the transistor. Also, the output of the op amp 2126 is tri-stated during the low power mode. During full power operations, the gate of transistor 2034 (see FIG. 20) may be pulled high and disconnected from transistors 2022 and 2024 and the Ibias current 2028 may be turned off.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. A communication system, comprising:
    phone line side circuitry that may be coupled to phone lines;
    powered side circuitry that may be coupled to the phone line side circuitry through a capacitive isolation barrier wherein a signal transmitted across the capacitive isolation barrier is utilized to provide a power supply for at least a portion of the phone line side circuitry;
    phone line side ringer circuitry formed within an integrated portion of the phone line side circuitry and powered side ringer circuitry formed within the powered side circuitry; and
    a capacitive interface coupling the phone line side ringer circuitry to phone lines.

2. The communication system of claim 1, further comprising the capacitive isolation barrier coupled between the phone line side circuitry and the powered side circuitry.

3. The communication system of claim 2, wherein the phone line side ringer circuitry is powered at least in part by power transmitted across the capacitive isolation barrier.

4. The communication system of claim 1, wherein the phone line side circuitry and the powered side circuitry are configured to communicate across the capacitive isolation barrier through digital signals.

5. The communication system of claim 4, further comprising the capacitive isolation barrier coupled between the phone line side circuitry and the powered side circuitry.

6. The communication system of claim 1, the capacitive interface formed solely with capacitors.

7. The communication system of claim 1, wherein the phone line side ringer circuitry is powered at least in part by power transmitted across the capacitive isolation barrier.

8. The communication system of claim 7,
    wherein the phone line side circuitry and the powered side circuitry are configured to communicate across the capacitive isolation barrier through digital signals.

9. The communication system of claim 7 wherein the signal includes a clock signal.

10. The communication system of claim 7, the capacitive interface formed solely with capacitors.

11. The communication system of claim 7, the capacitive isolation barrier comprising a plurality of isolation capacitors.

12. The communication system of claim 11, wherein the phone line side circuitry and the powered side circuitry are configured to communicate bidirectionally across the isolation barrier, at least some of the bidirectionally communication being through the same isolation capacitor.

13. The communication system of claim 1 wherein the phone line side circuitry and the powered side circuitry are configured to communicate across the capacitive isolation barrier through digital signals.

14. The communication system of claim 13, wherein the digital signals are communicated at least in part bidirectionally through the same isolation capacitor.

15. The communication system of claim 1, the capacitive isolation barrier formed solely with capacitors.

16. The communication system of claim 1, wherein circuitry utilized to extract the power from the signal transmitted across the capacitive isolation barrier is coupled to at least a first node of the phone line side circuitry, the first node operable to be coupled to at least one capacitor of the capacitive isolation barrier, clock information also being communicated through the first node.

17. The communication system of claim 1 wherein the signal includes a clock signal.

18. A method of providing a communication system that may be coupled to a phone line, comprising:
    coupling a capacitive isolation barrier between powered circuitry and phone line side circuitry;
    providing at least some phone line side integrated ringer circuitry within the phone line side circuitry and powered side ringer circuitry formed within the powered side circuitry;

receiving a signal within the phone line side circuitry, the signal being transmitted across the capacitive isolation barrier;

utilizing the signal transmitted across the capacitive barrier to provide a power supply for at least a portion of the phone line side circuitry; and capacitively coupling the phone line side integrated ringer circuitry to phone lines.

19. The method of claim 18, further comprising communicating in both a forward and reverse direction through the same isolation capacitor of the capacitive isolation barrier.

20. The method of claim 19, wherein circuitry utilized to extract power from across the barrier is coupled to at least a first node of the phone line side circuitry, the first node operable to be coupled to at least one capacitor of the capacitive isolation barrier, clock information also being communicated through the first node.

21. The method of claim 19, further comprising passing digital data across the capacitive isolation barrier.

22. The method of claim 21, the capacitive coupling further comprising linearly coupling the phone line side integrated ringer circuitry to phone lines.

23. The method of claim 22, further comprising powering at least a portion of the phone line side integrated ringer circuitry with power transmitted across the capacitive isolation barrier.

24. The method of claim 23, the capacitive coupling further comprising linearly coupling the integrated ringer circuitry to phone lines.

25. The method of claim 18, further comprising powering at least a portion of the phone line side integrated ringer circuitry with power transmitted across the capacitive isolation barrier.

26. The method of claim 25 wherein digital signals are communicated across the capacitive isolation barrier, at least some of the digital signals being bidirectionally communicated through the same isolation capacitor.

27. The method of claim 18, wherein the signal includes a clock signal.

28. A phone line connection circuit, comprising:

a phone line side integrated circuit containing phone line side ringer circuitry and a powered side integrated circuit containing powered side ringer circuitry, the phone line side integrated circuit configured to communicate with the powered side integrated circuit through a capacitive isolation barrier, the phone line side ringer circuitry detecting a ringing condition on TIP and RING phone lines;

a power supply circuit located within the phone line side integrated circuit, the power supply circuit generating a DC power supply from a digital signal received across the capacitive isolation barrier; and a capacitive interface coupling the ringer circuitry to the TIP and RING phone lines, the interface comprising at least a first and second capacitor.

29. The phone line connection circuit of claim 28, the first capacitor being connected in series between the ringer circuitry and the TIP line and the second capacitor being connected in series between the ringer circuitry and the RING line.

30. The phone line connection circuit of claim 29, the interface comprised solely of capacitors.

31. The phone line connection circuit of claim 30, the interface including a third capacitor.

32. The phone line connection circuit of claim 28, the capacitive interface being a linear interface.

33. The phone line connection circuit of claim 28, wherein the phone line side integrated circuitry and the powered side integrated circuitry are configured to communicate bidirectionally across the isolation barrier, at least some of the bidirectionally communication being through the same isolation capacitor.

34. The phone line connection circuit of claim 33, the digital signal including clock information.

35. The phone line connection circuit of claim 28, the digital signal including clock information.

36. The phone line connection circuit of claim 35, wherein the phone line side ringer circuitry is powered at least in part by power transmitted across the capacitive isolation barrier.

37. The phone line connection circuit of claim 28, wherein the phone line side ringer circuitry is powered at least in part by power transmitted across the capacitive isolation barrier.

38. A method of coupling an electrical circuit to a phone line, comprising:

providing at least a first ringer circuit within a phone line side integrated circuit and second ringer circuit within a powered side integrated circuit, the phone line side integrated circuit and the powered side integrated circuit capable of being coupled together through a capacitive isolation barrier;

utilizing a digital signal transmitted across the capacitive barrier to provide a power supply for at least a portion of the phone line side circuitry; and connecting the first ringer circuit to the phone line through a capacitor interface between the first ringer circuit and the phone line.

39. The method of claim 38, further comprising linearly attenuating a signal on the phone line with the capacitor interface.

40. The method of claim 39 wherein the attenuation of the signal lowers a maximum voltage level of the signal to a level compatible with integrated circuit voltage levels.

41. The method of claim 38, further comprising powering at least a portion of the first ringer circuit with power transmitted across the capacitive isolation barrier.

42. The method of claim 38, further comprising communicating in both a forward and reverse direction through the same isolation capacitor of the capacitive isolation barrier.

43. The method of claim 42, the digital signal including clock information.

44. The method of claim 43, further comprising powering at least a portion of the first ringer circuit with power transmitted across the capacitive isolation barrier.

45. The method of claim 38, the digital signal including clock information.

46. The method of claim 45, further comprising powering at least a portion of the first ringer circuit with power transmitted across the capacitive isolation barrier.

* * * * *